US012117870B2

United States Patent
Pyo et al.

(10) Patent No.: US 12,117,870 B2
(45) Date of Patent: Oct. 15, 2024

(54) DISPLAY DEVICE

(71) Applicant: LG ELECTRONICS INC., Seoul (KR)

(72) Inventors: Jonggil Pyo, Seoul (KR); Jaeyong Kim, Seoul (KR); Kwaneun Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 17/789,982

(22) PCT Filed: Dec. 31, 2019

(86) PCT No.: PCT/KR2019/018797
§ 371 (c)(1),
(2) Date: Jun. 29, 2022

(87) PCT Pub. No.: WO2021/137324
PCT Pub. Date: Jul. 8, 2021

(65) Prior Publication Data
US 2022/0382330 A1    Dec. 1, 2022

(51) Int. Cl.
*G06F 1/16*    (2006.01)
(52) U.S. Cl.
CPC .......... *G06F 1/1652* (2013.01); *G06F 1/1656* (2013.01)
(58) Field of Classification Search
CPC ....... G06F 1/1652; G06F 1/1656; G09F 9/301
See application file for complete search history.

(56) References Cited

U.S. PATENT DOCUMENTS

| 2010/0188350 | A1* | 7/2010  | Sawada  | H05K 5/0017 345/173 |
|---|---|---|---|---|
| 2015/0047796 | A1  | 2/2015  | Peng et al. | |
| 2017/0161868 | A1* | 6/2017  | Kim     | G06F 1/1601 |
| 2017/0196102 | A1* | 7/2017  | Shin    | G06F 1/1605 |
| 2018/0375054 | A1  | 12/2018 | Wang et al. | |
| 2019/0333968 | A1* | 10/2019 | Yamada  | H10K 50/11 |

FOREIGN PATENT DOCUMENTS

| KR | 10-2017-0066838 | 6/2017 |
|---|---|---|
| KR | 10-2017-0081345 | 7/2017 |
| KR | 10-2017-0143112 | 12/2017 |

OTHER PUBLICATIONS

PCT International Application No. PCT/KR2019/018797, International Search Report dated Sep. 25, 2020, 4 pages.

* cited by examiner

*Primary Examiner* — Abhishek M Rathod
*Assistant Examiner* — Keon Kim
(74) *Attorney, Agent, or Firm* — LEE, HONG, DEGERMAN, KANG & WAIMEY

(57) ABSTRACT

A display device is disclosed. The display device of the present disclosure may comprise: a flexible display panel; a panel roller which is elongated and on or from which the display panel is wound or unwound; a housing in which the panel roller is accommodated, wherein while the display panel is unwound from the panel roller, the display panel descends below the housing; and a board case which is disposed behind the display panel descending below the housing, and of which the front surface is covered by the display panel while the display panel descends.

8 Claims, 40 Drawing Sheets

DISPLAY DEVICE

CROSS-REFERENCE TO RELATED APPLICATIONS

This application is the National Stage filing under 35 U.S.C. 371 of International Application No. PCT/KR2019/018797, filed on Dec. 31, 2019, the contents of which are hereby incorporated by reference herein its entirety.

TECHNICAL FIELD

The present disclosure relates to a display device.

BACKGROUND ART

As the information society has developed, the demand for display device is increasing in various forms, and accordingly, in recent years, various display devices such as a liquid crystal display (LCD), plasma display panel (PDP), electroluminescent display (ELD), vacuum fluorescent display (VFD), and the like have been studied and used.

Among them, a display device using an organic light emitting diode (OLED) has excellent luminance and viewing angle characteristics in comparison with a liquid crystal display device and does not require a backlight unit, thereby being implemented in an ultrathin type.

In addition, a flexible display panel can be bent or wound around a roller. The flexible display panel may be used to implement a display device that unfolds on a roller or winds around the roller. Many studies have been made on a structure for winding a flexible display panel around a roller or unwinding the flexible display panel from the roller.

DISCLOSURE

Technical Problem

The present disclosure is directed to solve the above and other problems.

Another aspect of the present disclosure is to ensure structural rigidity for preventing sagging of a display device.

Yet another aspect of the present disclosure is to ensure structural rigidity for preventing twisting of a display device.

A further aspect of the present disclosure is to provide a structure for preventing bending of a display panel.

Technical Solution

An embodiment of the present disclosure provides a display device comprising: a flexible display panel; a panel roller which is elongated and on or from which the display panel is wound or unwound; a housing in which the panel roller is accommodated, wherein while the display panel is unwound from the panel roller, the display panel descends below the housing; and a board case which is disposed behind the display panel descending below the housing, and of which the front surface is covered by the display panel while the display panel descends.

Advantageous Effects

A display device according to the present disclosure has the following effects.

According to at least one of the embodiments of the present disclosure, it is possible to ensure structural rigidity for preventing sagging of a display device.

According to at least one of the embodiments of the present disclosure, it is possible to ensure structural rigidity for preventing twisting of a display device.

According to at least one of the embodiments of the present disclosure, it is possible to provide a structure for preventing bending of a display panel.

Additional scope of applicability of the present disclosure will become apparent from the following detailed description. However, various changes and modifications within the spirit and scope of the present disclosure may be clearly understood by those skilled in the art, and thus, it should be understood that specific embodiments, such as the detailed description and preferred embodiments of the present disclosure, are given only by way of illustration.

MODE FOR DISCLOSURE

Figure 1:
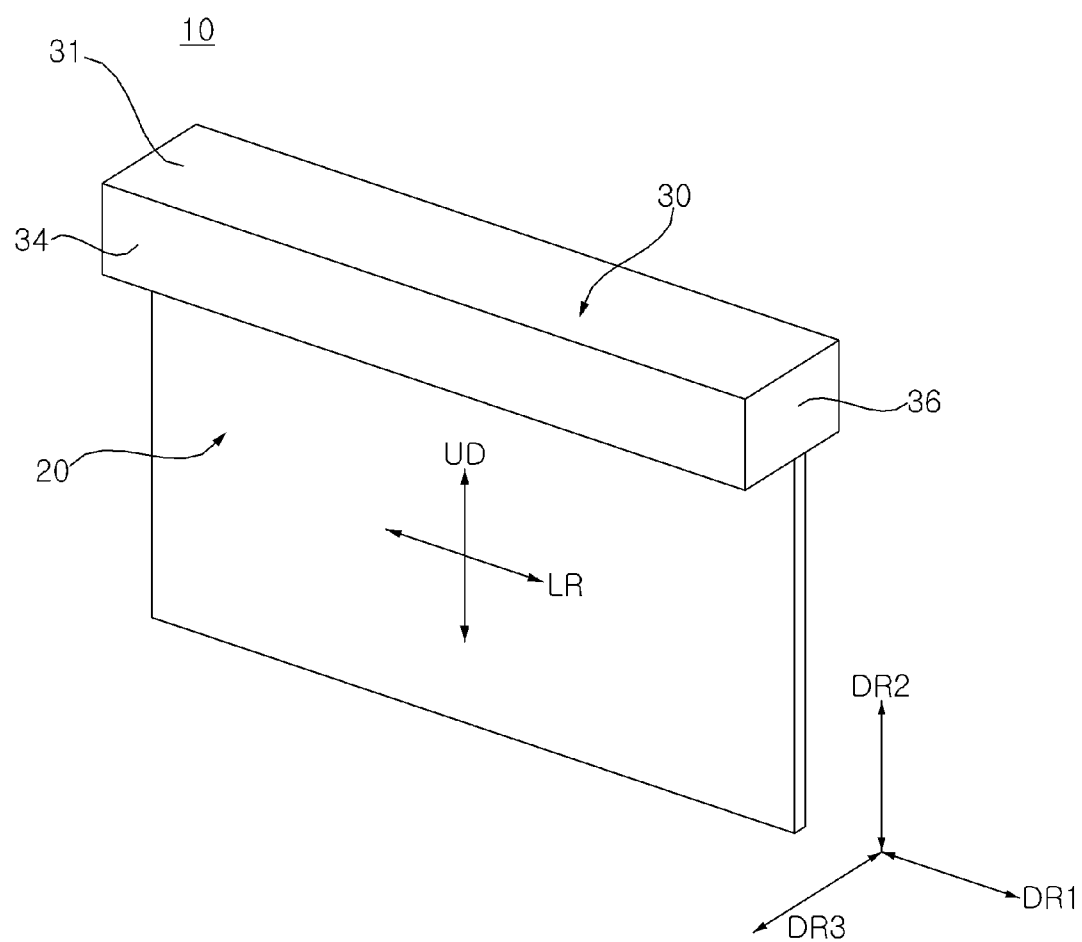
FIGS. 1 to 40 are diagrams illustrating examples of a display device according to embodiments of the present disclosure.

Hereinafter, embodiments of the present disclosure will be described in detail with reference to the accompanying drawings, however, the same or similar elements are denoted by the same reference numerals regardless of the reference numerals, and redundant description thereof will be omitted.

The suffixes "module" and "part" for components used in the following description are given or mixed in consideration of ease of specification, and do not have their own meaning or role.

Further, in describing the embodiments disclosed in this specification, when it is determined that the detailed description of the related art is likely to blur the gist of the embodiment disclosed in this specification, a detailed description thereof will be omitted. Also, the accompanying drawings are only for the purpose of easily understanding the embodiments disclosed in the present disclosure, and the technical idea disclosed in the present disclosure is not limited by the accompanying drawings, it should be understood that the present disclosure include all modifications, equivalents and substitutes included within the spirit and technical scope of the present disclosure.

The terms first, second, etc. may be used to describe various components, but the components are not limited by such terms. The terms are used only for the purpose of distinguishing one component from other components.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

A singular expression can include a plural expression as long as it does not have an apparently different meaning in context.

In the following description, even if an embodiment is described with reference to a specific figure, if necessary, a reference numeral not shown in the specific figure may be referred to, and a reference numeral not shown in the specific figure is used when the reference numeral is shown in the other figures.

Referring to FIG. 1, a display device 10 may include a display unit 20 and a housing 30. The housing 30 may have an internal space. At least a portion of the display unit 20 may be located inside the housing 30. At least a portion of the display unit 20 may be located outside the housing 30. The display unit 20 may display a screen.

The direction parallel to the longitudinal direction of the housing 30 may be referred to as a first direction DR1, a leftward direction, or a rightward direction. The direction in which the display unit 20 displays a screen may be referred to as a forward direction or the front. The direction opposite the direction in which the display unit 20 displays an image may be referred to as a rearward direction or the rear. The direction parallel to the height direction of the display device 10 may be referred to as a second direction DR2, an upward direction, or a downward direction.

The third direction DR3 may be a direction perpendicular to the first direction DR1 and/or the second direction DR2. The first direction DR1 and the second direction DR2 may be collectively referred to as a horizontal direction. In addition, the third direction DR3 may be referred to as a vertical direction. A leftward-rightward direction LR may be parallel to the first direction DR1, and an upward-downward direction UD may be parallel to the second direction DR2.

Figure 2:
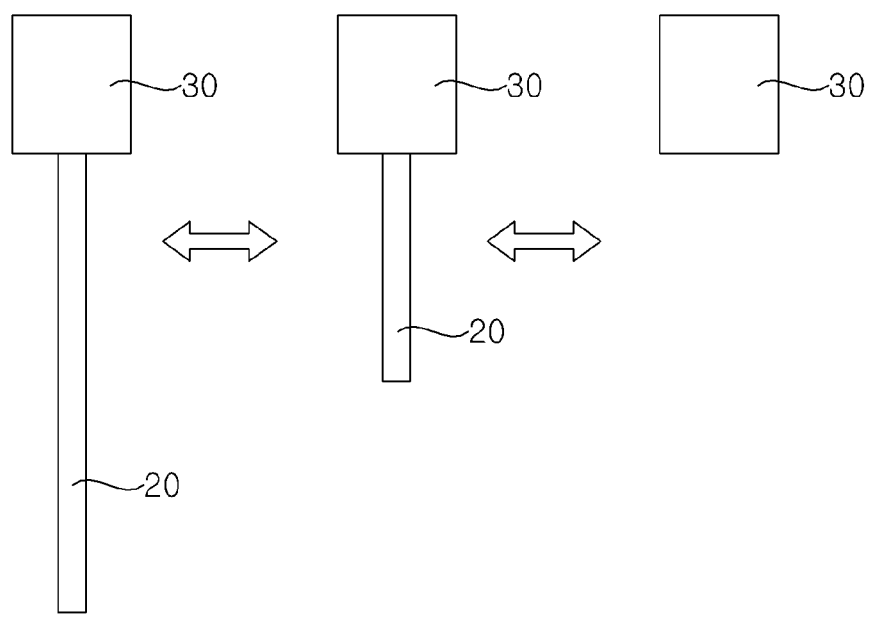

Referring to FIG. 2, the display unit 20 may be entirely located inside the housing 30. At least a portion of the display unit 20 may be located outside the housing 30. The degree to which the display unit 20 is exposed to the outside of the housing 30 may be adjusted as necessary.

Figure 3:
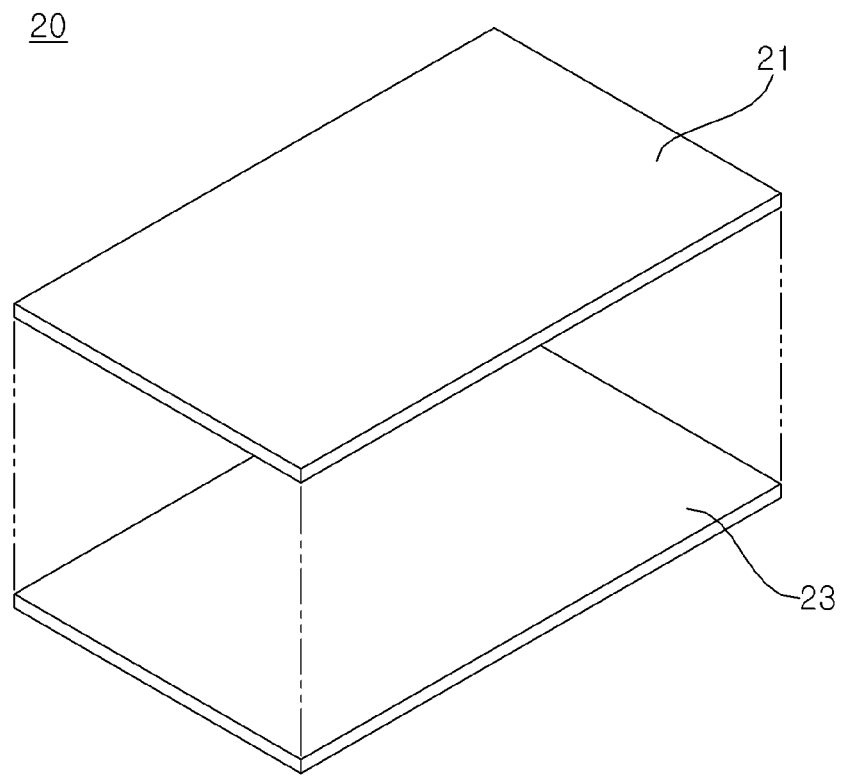

Referring to FIG. 3, the display unit 20 may include a display panel 21 and a plate 23. The display panel 21 may be flexible. For example, the display panel 21 may be an organic light emitting display (OLED).

The display panel 21 may have a front surface for displaying an image. The display panel 21 may have a rear surface facing the front surface. The front surface of the display panel 21 may be covered with a light transmissive material. For example, the light transmissive material may be a synthetic resin or film.

The plate 23 may be coupled, fastened, or attached to the rear surface of the display panel 21. The plate 23 may include a metal material. The plate 23 may be referred to as a module cover 23, a cover 23, a display panel cover 23, a panel cover 23, or an apron 23.

Figure 4:
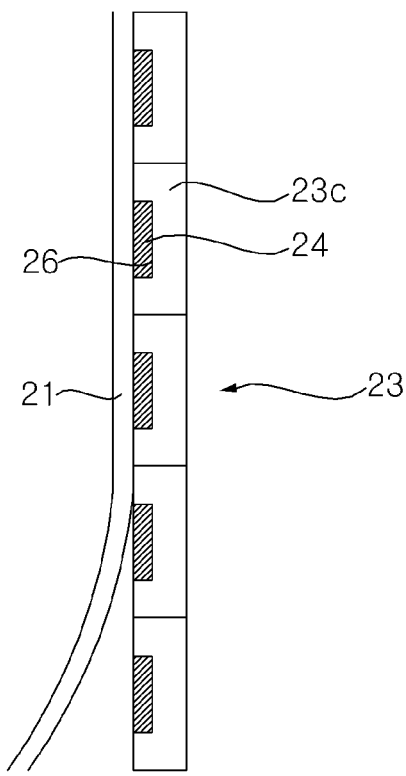

Referring to FIG. 4, the plate 23 may include a plurality of segments 23c. A magnet 24 may be located inside a recess 26 of the segment 23c. The recess 26 may be located on a surface of the segment facing the display panel 21. The recess 26 may be located in the front surface of each segment 23c. Since the magnet 24 is received inside the recess 26, the magnet 24 may not protrude from the segment 23c. The display panel 21 may be flat without being wrinkled even when it is in contact with the segment 23c.

Figure 5:
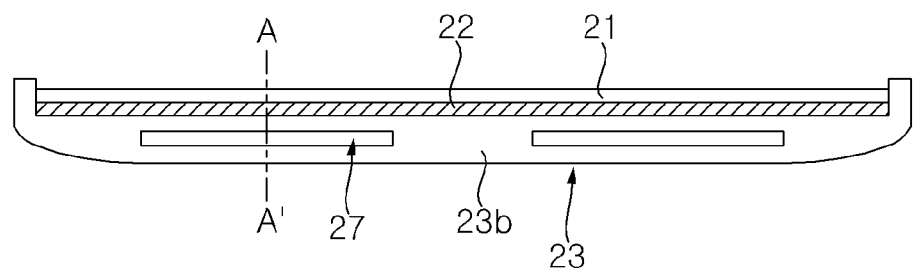
Figure 5:
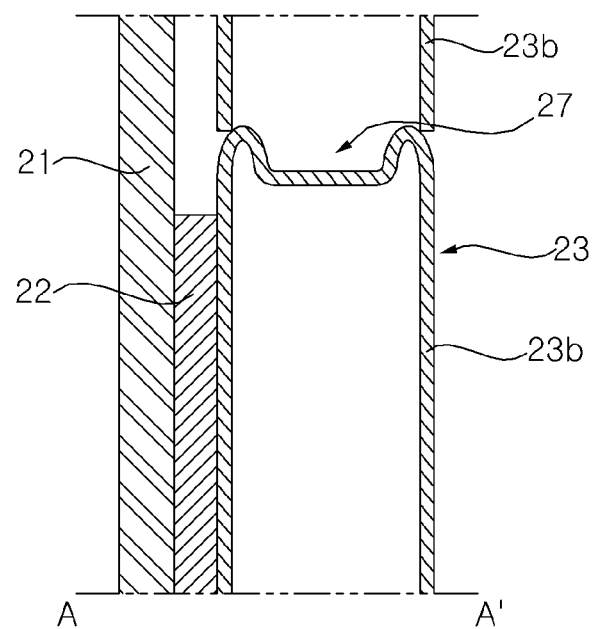

Referring to FIG. 5, a bead 27 may be formed on an upper surface of a segment 23b. The bead 27 may have a shape recessed to the inside of the segment 23b. For example, the bead 27 may be formed by pressing the segment 23b. A plurality of beads 27 may be formed on the segment 23b. The plurality of beads 27 may be spaced apart from each other. The beads 27 can improve the rigidity of the segment 23b. For example, the bead 27 can prevent the shape of the segment 23b from being deformed by an external impact. The segment 23b may be fixed to the rear of the display pane 21 by an adhesive member 22. For example, the adhesive member 22 may be double-sided tape.

Figure 6:
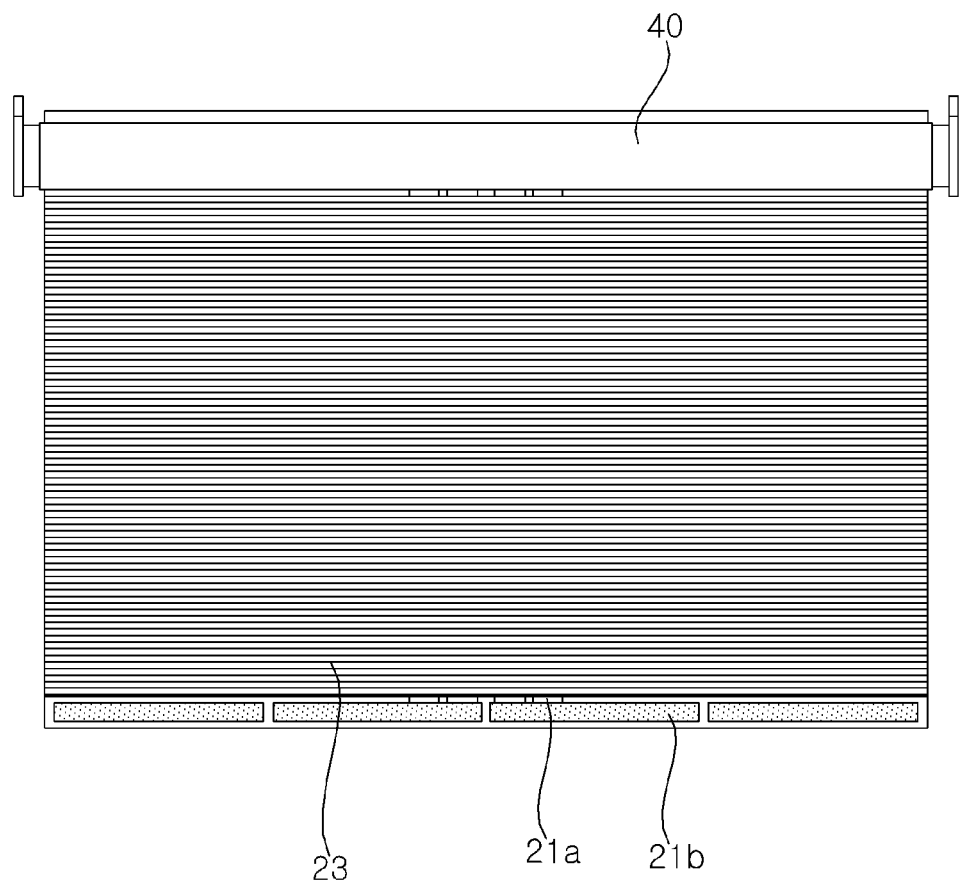

Referring to FIG. 6, a source PCB 21b may be positioned on the lower side of the module cover 23. In the case of roll-down or roll-up, the position of the source PCB 21b may change depending on the movement of the module cover 23. An FFC cable 21a may be positioned in the center of the module cover 23 with respect to the first direction. The FFC cable 21a may be positioned on opposite ends of the module cover 23 with respect to the first direction.

Figure 7:
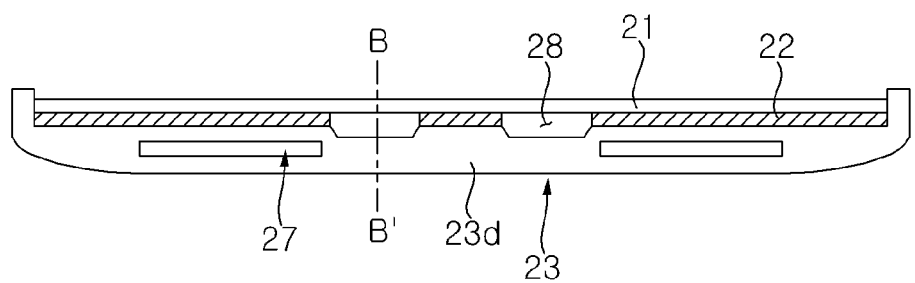
Figure 7:
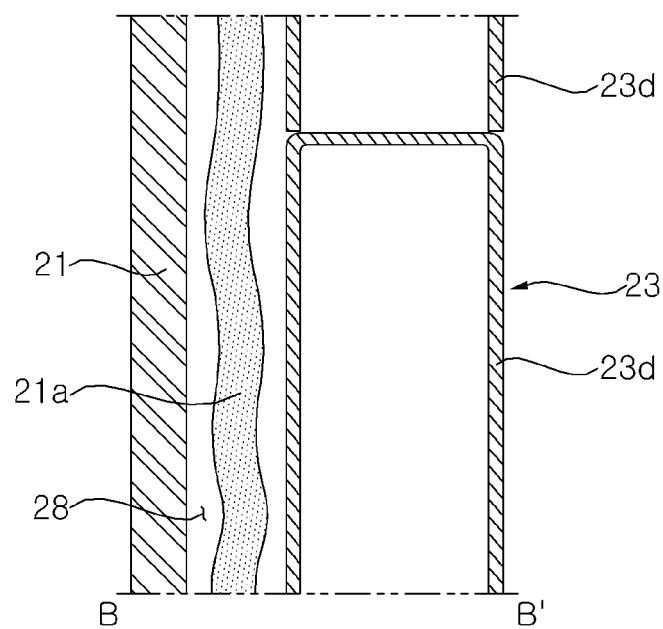

Referring to FIG. 7, a segment 23d may include a recess 28 that is recessed inwardly of the segment 23d. The recess 28 may form a space between the display panel 21 and the module cover 23. The FFC cable 21a may be received in the space formed by the recess 28. The recess 28 can improve the rigidity of the segment 23d. The bead 27 may be positioned on the segment 23d except the part where the recess 28 is positioned. The position of the recess 28 may not overlap the position of the bead 27 in order to prevent a reduction in rigidity of the segment 23d.

Figure 8:
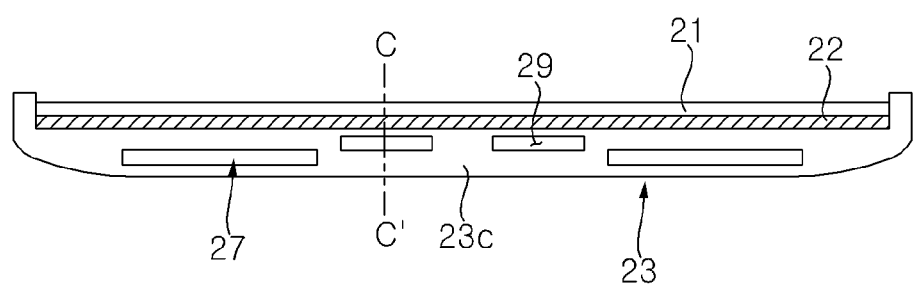
Figure 8:
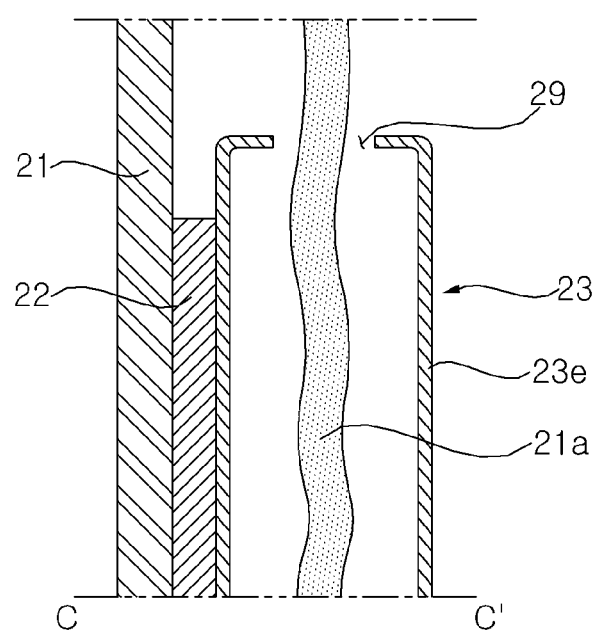

Referring to FIG. 8, a segment 23e may have a through portion 29 positioned in the center with respect to the first direction. The through portion 29 may pass through a central portion of the segment 23e in the second direction. Namely, the through portion 29 may be a hole positioned in the segment 23e. The through portion 29 may be a portion in which the FFC cable 21a is positioned. Because the through portion 29 is formed inside the segment 23d, the thickness of the segment 23e may be reduced compared to when the FFC cable 21a is positioned in the recess 28 (see FIG. 7). The bead 27 may be positioned on the segment 23e except the part where the through portion 29 is positioned. The position of the through portion 29 may not overlap the position of the bead 27 in order to prevent a reduction in rigidity of the segment 23e.

Figure 9:
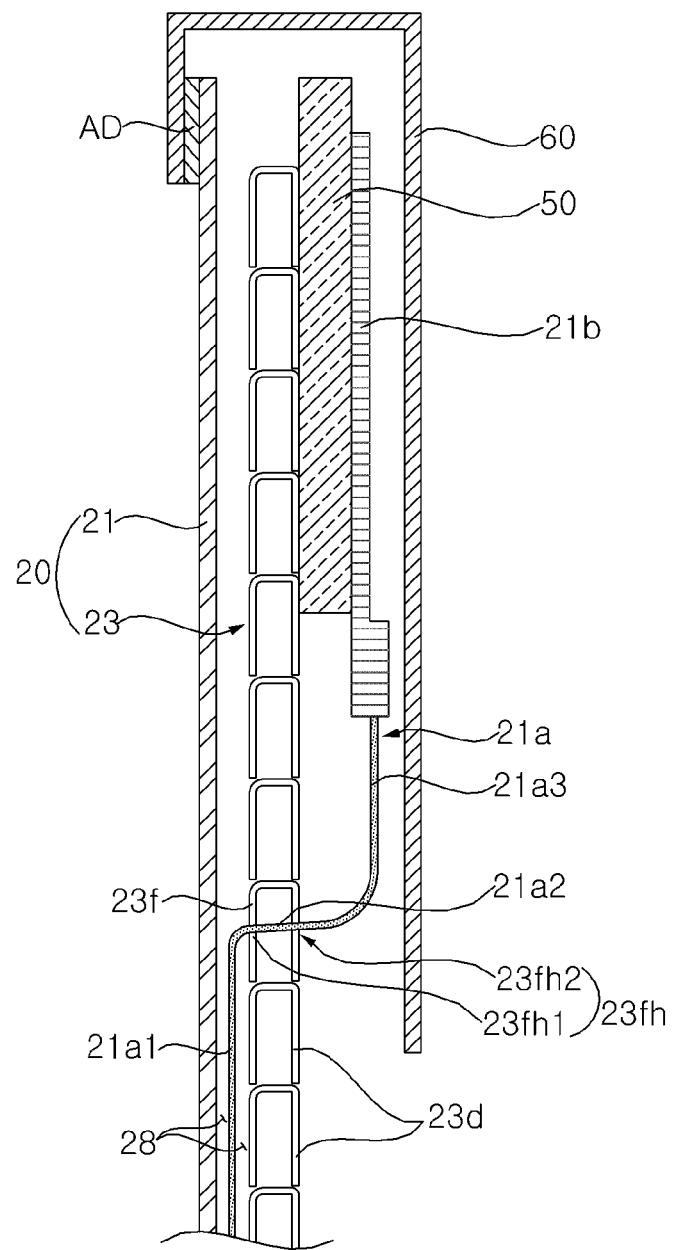

Referring to FIG. 9, a top case 60 may cover the source PCB 21b and the upper bar 50 as well as the display panel 21 and the module cover 23. One surface of the upper bar 50 may be coupled to the rear surface of the module cover 23, and the other surface of the upper bar 50 may be coupled to the source PCB 21b. The upper bar 50 may be fixed to the module cover 23 and may support the source PCB 21b.

Figure 10:
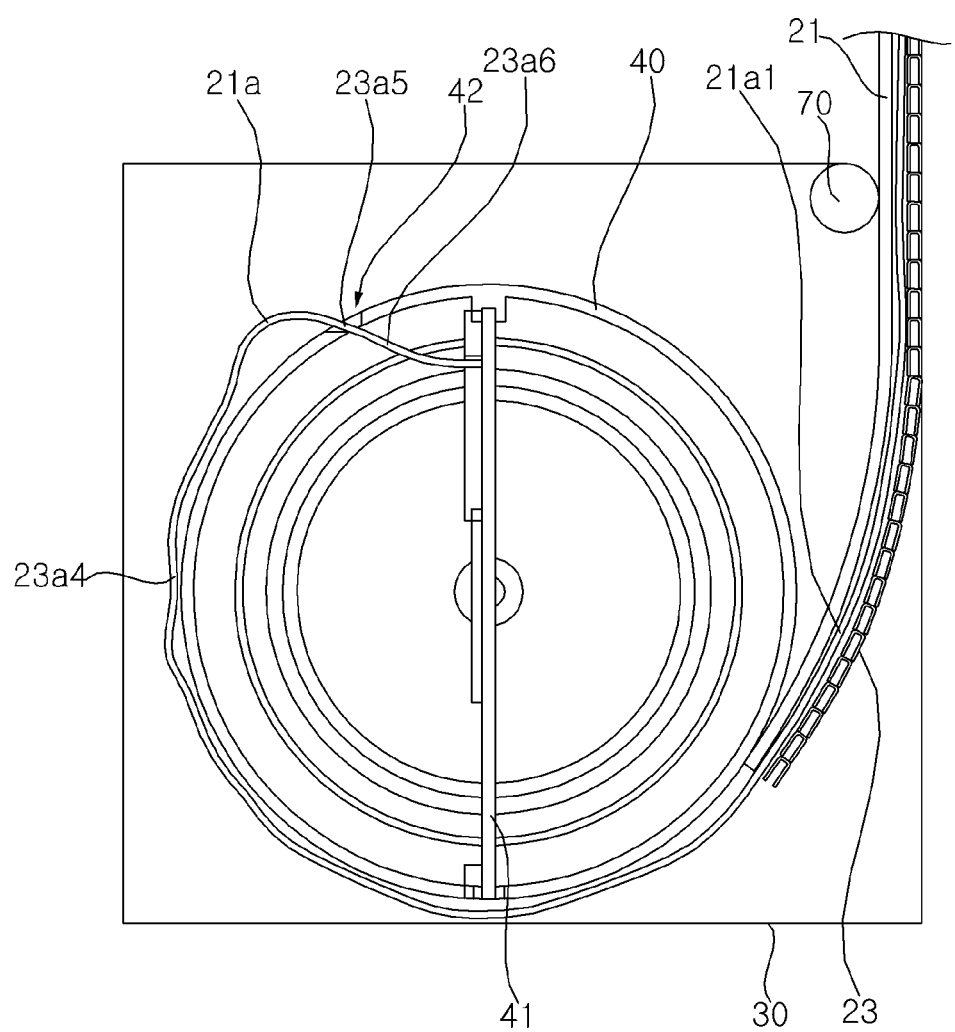

A lower end of the FFC cable 21a may be connected to a timing controller board 41 (see FIG. 10) inside a panel roller 40 (see FIG. 10). The FFC cable 21a, together with the display unit 20, may be wound around or unwound from the panel roller 40.

A portion of the FFC cable 21a may be positioned between the display panel 21 and the module cover 23. The portion of the FFC cable 21a that is positioned between the display panel 21 and the module cover 23 may be referred to as a first portion 21a1. The first portion 21a1 may be positioned in the recess 28 in which the plurality of segments 23d is formed. Alternatively, the first portion 21a1 may be received in the recess 28 in which the plurality of segments 23d is formed.

A portion of the FFC cable 21a may pass through a segment 23f. The portion of the FFC cable 21a that passes through the segment 23f may be referred to as a second portion 21a2. The segment 23f may include a first hole 23fh1 formed at a front surface and a second hole 23fh2 formed at a rear surface. The first hole 23fh1 and the second hole 23fh2 may be connected to each other to form one hole 23fh. The hole 23fh may pass through the segment 23f in the third direction. The second portion 21a2 may pass through the hole 23fh. The hole 23fh may be referred to as a connection hole 23fh.

An upper end of the FFC cable 21a may be electrically connected to the source PCB 21b. A portion of the FFC cable 21a may be positioned on the rear surface of the module cover 23. The portion of the FFC cable 21a that is positioned on the rear surface of the module cover 23 may be referred to as a third portion 21a3. The third portion 21a3 may be electrically connected to the source PCB 21b.

The third portion 21a3 may be covered by the top case 60. Hence, the third portion 21a3 may not be exposed to the outside.

Referring to FIG. 10, the FFC cable 21a may be connected to the timing controller board 41 mounted on the panel roller 40. A through hole 42 may be formed on the panel roller 40, and the FFC cable 21a may be connected to one side of the timing controller board 41 through the through hole 42.

The through hole 42 may be positioned on one side of the panel roller 40 and may pass through an outer circumferential portion of the panel roller 40. The FFC cable 21a may be connected to one side of the timing controller board 41 through the through hole 42.

Even if the FFC cable 21a is positioned on the outer circumference of the panel roller 40, the connection between the FFC cable 21a and the timing controller board 41 can be maintained by the through hole 42. Hence, the FFC cable 21a rotates together with the panel roller 40 and may not be twisted.

A portion of the FFC cable 21a may be wound around the panel roller 40. The portion of the FFC cable 21a wound around the panel roller 40 may be referred to as a fourth portion 23a4. The fourth portion 23a4 may come into contact with an outer circumferential surface of the panel roller 40.

A portion of the FFC cable 21a may pass through the through hole 42. The portion of the FFC cable 21a that passes through the through hole 42 may be referred to as a fifth portion 23a5.

The lower end of the FFC cable 21a may be electrically connected to the timing controller board 41. A portion of the FFC cable 21a may be positioned inside the panel roller 40. The portion of the FFC cable 21a that is positioned inside the panel roller 40 may be referred to as a sixth portion 23a6. The sixth portion 23a6 may be electrically connected to the timing controller board 41.

Figure 11:
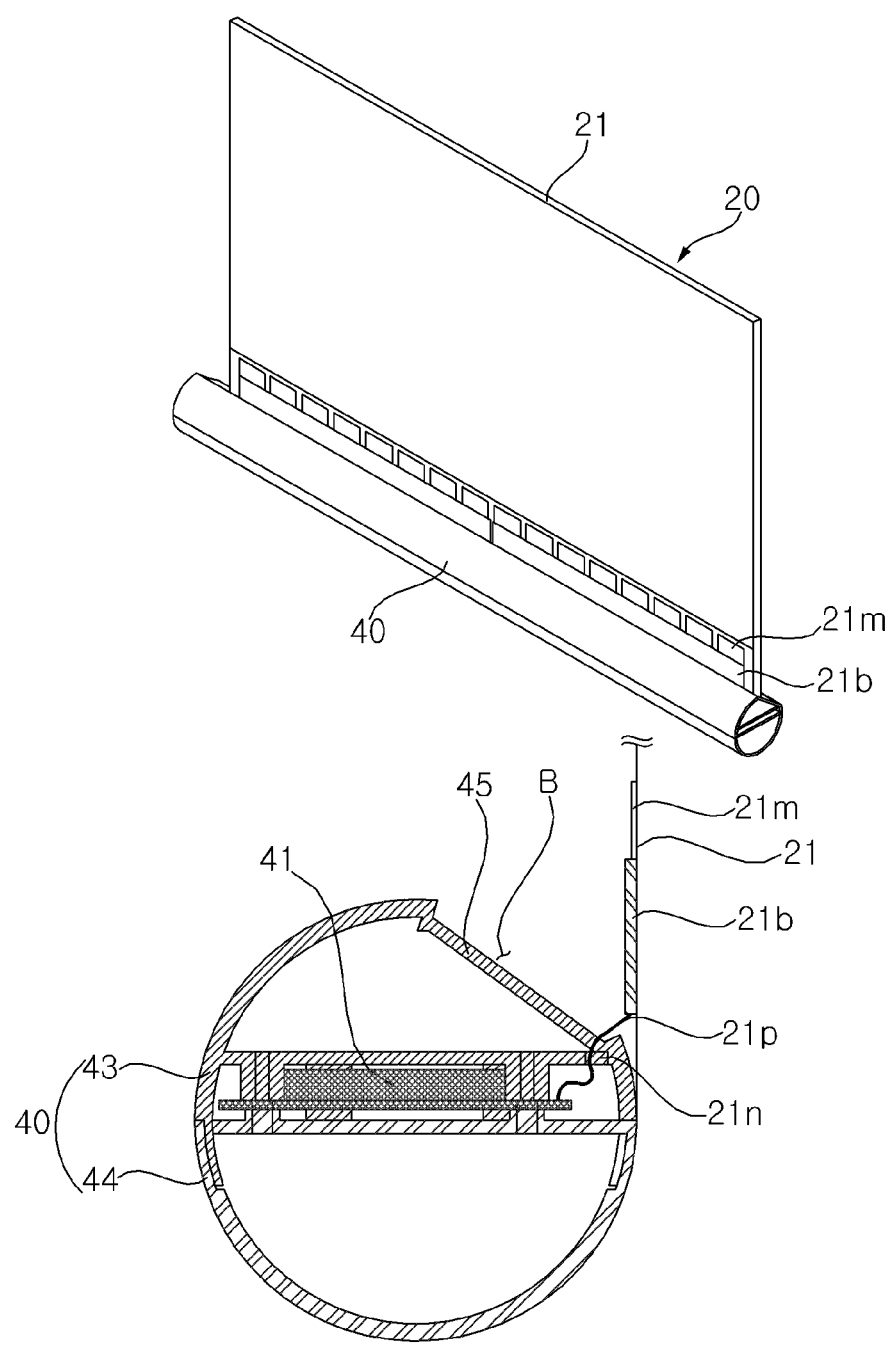

Referring to FIG. 11, the display panel 21 may be connected to the roller 40. The display panel 21 may be wound around or unwound from the roller 40. The display panel 21 may be electrically connected to a plurality of source PCBs 21b. The plurality of source PCBs 21b may be spaced apart from each other.

A source chip on film (COF) 21m may connect the display panel 21 and the source PCBs 21b. The source COF 21m may be located at the lower side of the display panel 21. The roller 40 may include a first part 43 and a second part 44. The first part 43 and the second part 44 may be fastened by a screw. A timing controller board 41 may be mounted in the roller 40.

The source PCBs 21b may be electrically connected to the timing controller board 41. The timing controller board 41 may send digital video data and timing control signals to the source PCBs 21b.

A cable 21p may electrically connect the source PCBs 21b and the timing controller board 41. For example, the cable 21p may be a flexible flat cable (FFC). The cable 21p may pass through a hole 21n. The hole 21n may be formed in a seating portion 45 or the first part 43. The cable 21p may be located between the display panel 21 and the second part 44.

The seating portion 45 may be formed in an outer circumference of the first part 43. The seating portion 45 may be formed by stepping a portion of the outer circumference of the first part 43. The seating portion 45 may form a space B. When the display unit 20 is wound around the roller 40, the source PCBs 21b may be received in the seating portion 45. Since the source PCBs 21b are received in the seating portion 45, they may not be warped or bent, and their durability may be improved.

Figure 12:
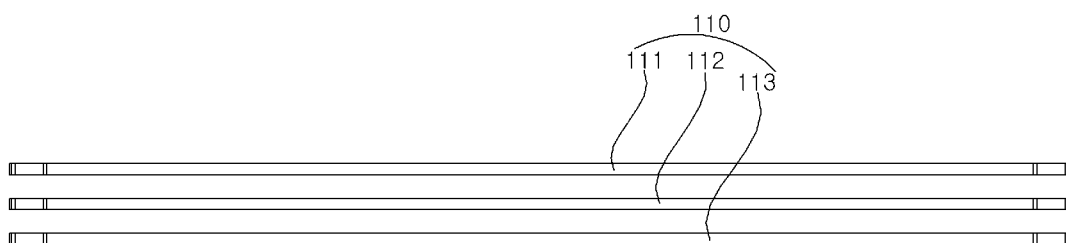
Figure 13:
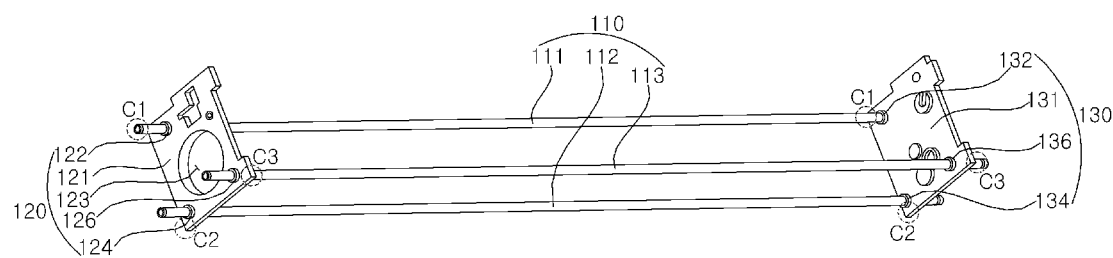

Referring to FIGS. 12 and 13, a pipe 110 may extend longitudinally in leftward and rightward directions. A plurality of pipes 110 may be provided. The plurality of pipes 110 may include a first pipe 111, a second pipe 112, and a third pipe 113. The plurality of pipes 110 may be parallel to each other. For example, the pipes 110 may a hollow cylinder. For another example, the pipes 110 may be a cylindrical bar.

The pipes 110 may be coupled to the frames 120 and 130 as they are inserted into frames 120 and 130. The frames 120 and 130 may have a first frame 120 and a second frame 130. The first frame 120 may be positioned contiguous to one end of the pipes 110, and the second frame 130 may be positioned contiguous to the other end of the pipes 110. The first frame 120 may face the second frame 130.

For example, the frames 120 and 130 may be a rectangular plate. The first pipe 111 may be inserted into the frames 120 and 130, contiguous to a first corner C1 of the first frame 120 and the second frame 130. The second pipe 112 may be inserted into the frames 120 and 130, contiguous to a second corner C2 of the first frame 120 and the second frame 130. The third pipe 113 may be inserted into the frames 120 and 130, contiguous to a third corner C3 of the first frame 120 and the second frame 130.

A central opening 123 may be formed in a plate 121 of the first frame 120. The central opening 123 may be a circle that is formed through the plate 121 of the first frame 120. The first pipe 111, the second pipe 112, and the third pipe 113 may be disposed in a triangular shape with respect to the central opening 123.

Referring to FIG. 13, couplings 122, 124, 126, 132, 134, and 136 may be formed on the plates 121 and 131. The first frame 120 may include an eleventh coupling 122, a twelfth coupling 124, and a thirteenth coupling 126 that are formed on the plate 121. The second frame 130 may include a twenty-first coupling 132, a twenty-second coupling 134, and a twenty-third coupling 136 that are formed on the plate 131. The first pipe 111 may be inserted into the eleventh coupling 122 and the twenty-first coupling 132. The second pipe 112 may be inserted into the twelfth coupling 124 and the twenty-second coupling 134. The third pipe 113 may be inserted into the thirteenth coupling 126 and the twenty-third coupling 136. The couplings 122, 124, 126, 132, 134, and 136 may be referred to as intermediate couplers 122, 124, 126, 132, 134, and 136.

Figure 14:
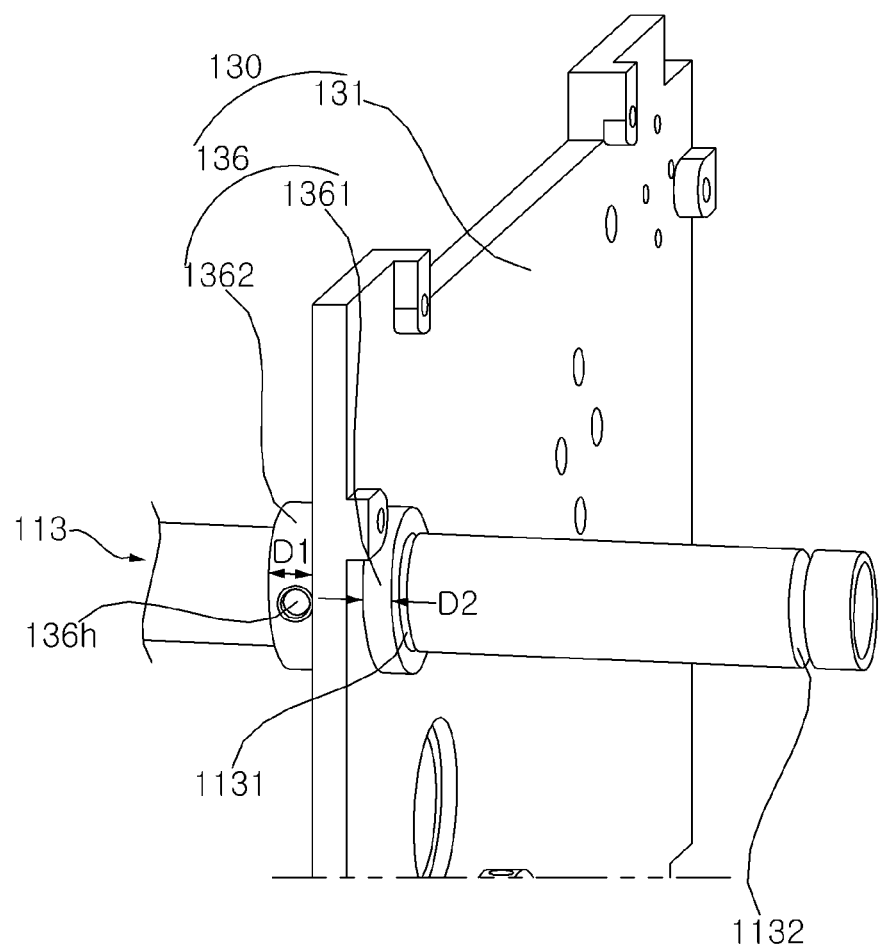
Figure 15:
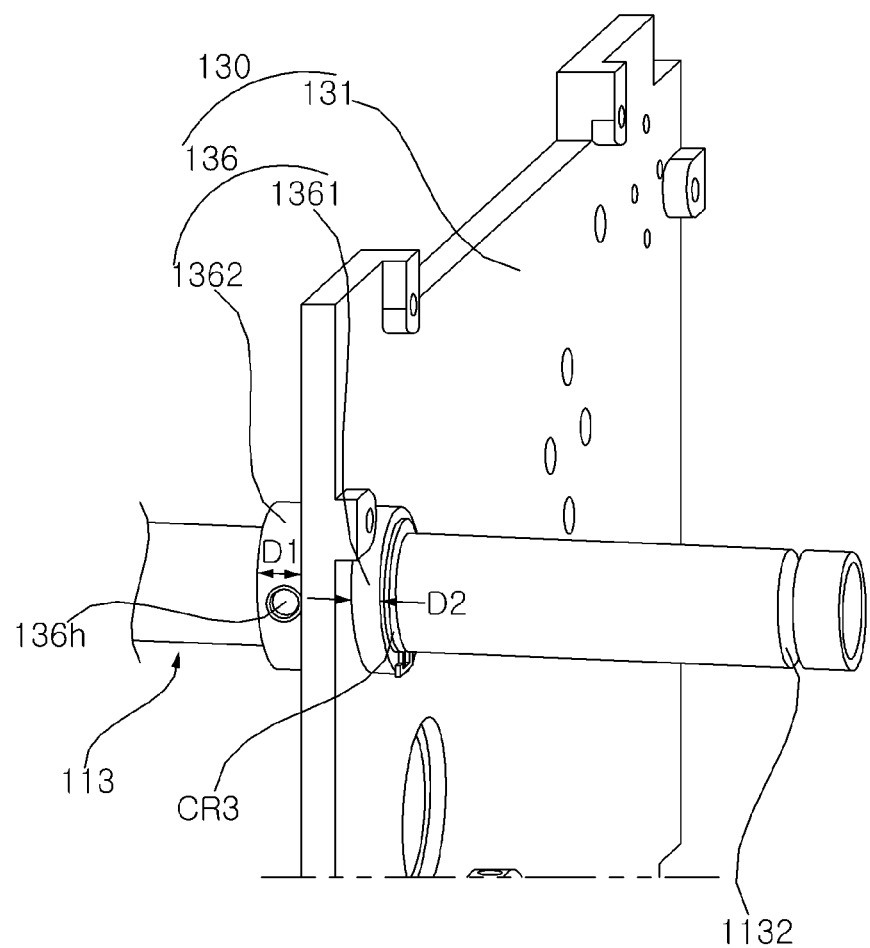
Figure 16:
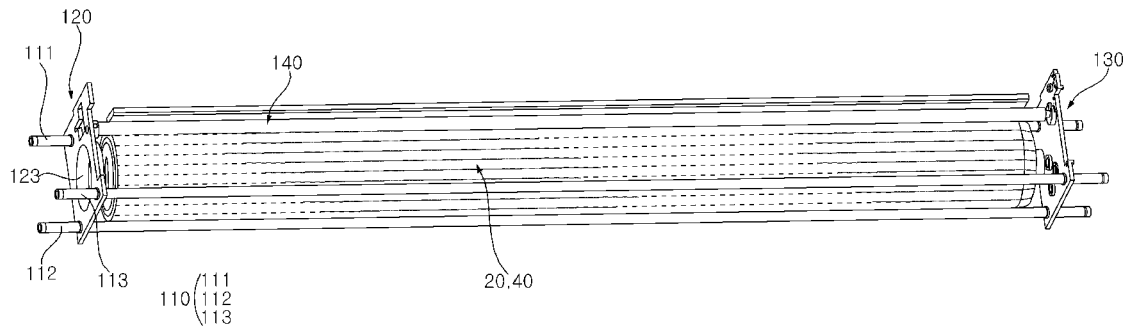
Figure 17:
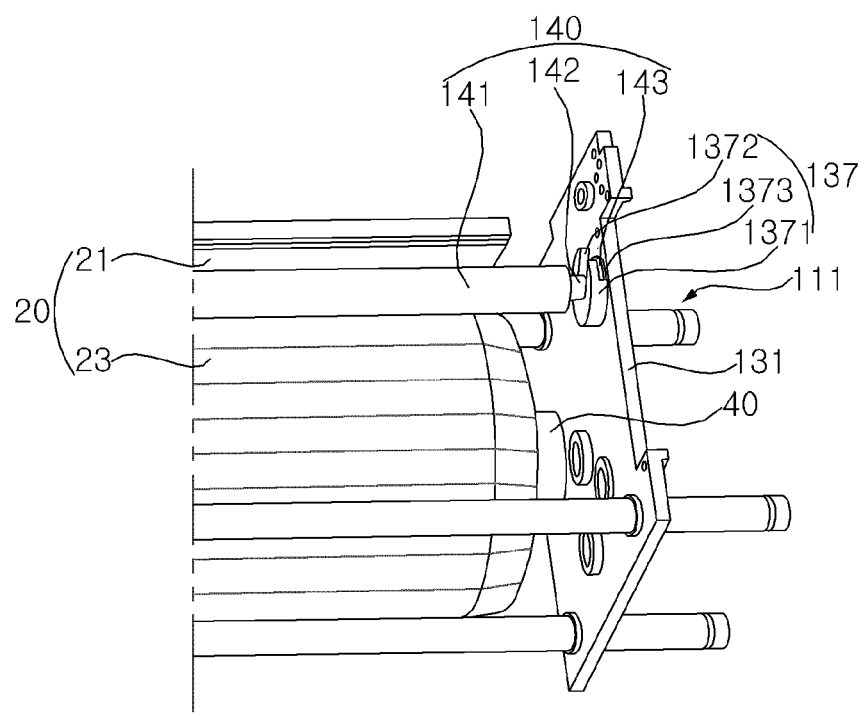
Figure 18:
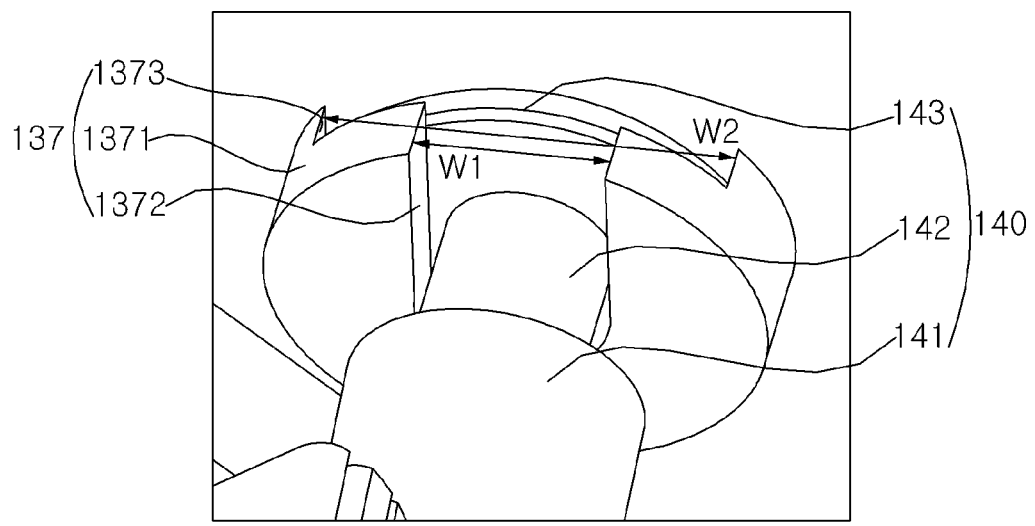
Figure 19:
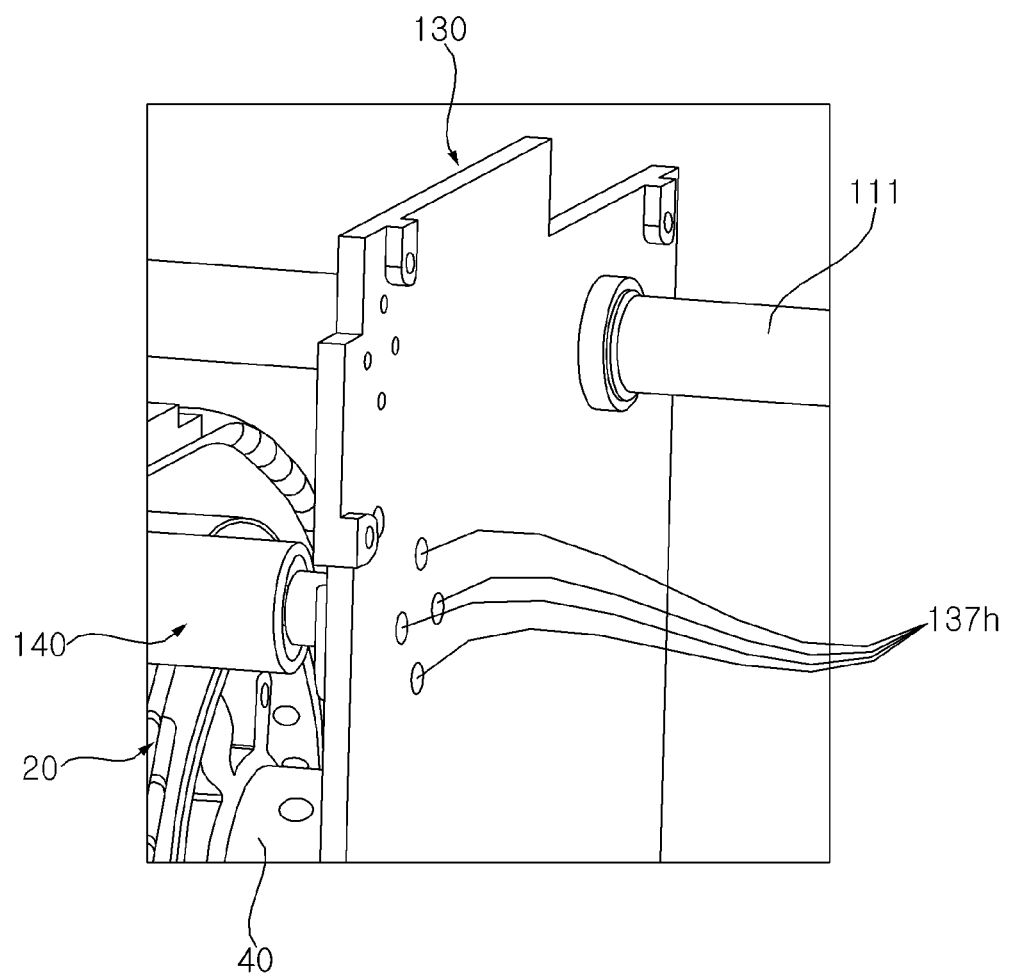

Referring to FIGS. 14 and 15, the coupling 136 may have the shape of a cylinder that is formed through the plate 131. The coupling 136 may be fixed to the plate 131, or may be formed integrally with the plate 131. The coupling 136 may have an outer side 1361 and an inner side 1362 with respect to the plate 131. The distance D2 of the outer side 1361 may be smaller than the distance D1 of the inner side 1362. A fastening hole 136h may be formed in the inner side 1362. As a screw is fastened to the fastening hole 136h, the pipe 113 may be fixed to the frame 130.

A first neck 1131 may be contiguous to the outer side 1361 of the coupling 136 and form an engraved ring on an outer surface of the pipe 113 as it is recessed inwardly of the pipe 113. A second neck 1132 may be contiguous to a distal end of the pipe 113 and form an engraved ring on the outer surface of the pipe 113 as it is recessed inwardly of the pipe 113, spaced apart from the distal end of the pipe 113. As a coupling ring CR3 is fastened to the first neck 1131, the pipe 113 may be firmly fixed to the frame 130. For example, the coupling ring CR3 may be an E-ring.

Referring to FIGS. 16 to 19, the display unit 20 wound around the panel roller 40 may be inserted between the first pipe 111, the second pipe 112, the third pipe 113, the first frame 120, and/or the second frame 130. The panel roller 40 may be disposed parallel to the first pipe 111, the second pipe 112, or the third pipe 113.

As the panel roller 40 and the display unit 20 are positioned between the pipes 110 and the frames 120 and 130, the guide roller 140 may be coupled to the frames 120 and 130. The guide roller 140 may have a shaft 142, a roller 141, and a fixed plate 143.

A support portion 137 may be formed on the plate 131. The support portion 137 may support the shaft 142 of the guide roller 140. The shaft 142 may be fixed to the support portion 137, and the roller 140 may rotate on the shaft 142. The support portion 137 may be formed on an inner side of the plate 131.

The support portion 137 may include a body 1371, a shaft groove 1372, and a plate insertion groove 1373. The body 1371 may have the shape of a cylinder that protrudes from an inner surface of the plate 131. The shaft groove 1372 may be depressed inward of the body 1371 from the outer periphery of the body 1371. The plate insertion groove 1373 may be depressed inward of the body 1371 from the outer periphery of the body 1371, between the shaft groove 1372 and the plate 131. The groove width W2 of the plate insertion groove 1373 may be larger than the groove width W1 of the shaft groove 1372.

In other words, the shaft groove 1372 may have a groove width W1 corresponding to the diameter of the shaft 142, and the plate insertion groove 1373 may have a groove width W2 corresponding to the diameter of the fixed plate 143. As the shaft 142 of the guide roller 140 is inserted into the shaft groove 1372, and the fixed plate 143 of the guide roller 140 is inserted into the plate insertion groove 1373 of the support portion 137, the guide roller 140 may be supported by the support portion 137.

Figure 21:
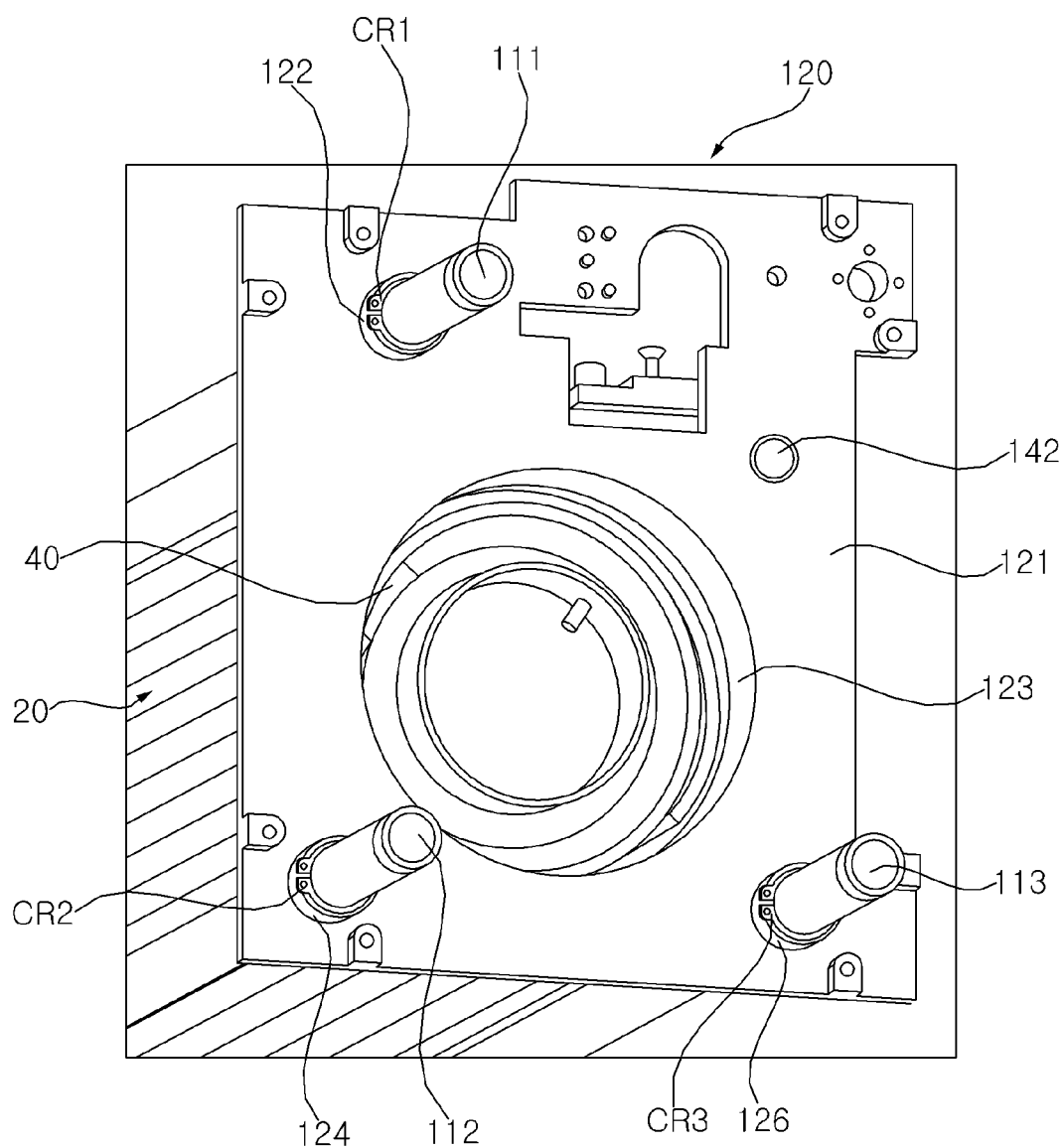
Figure 22:
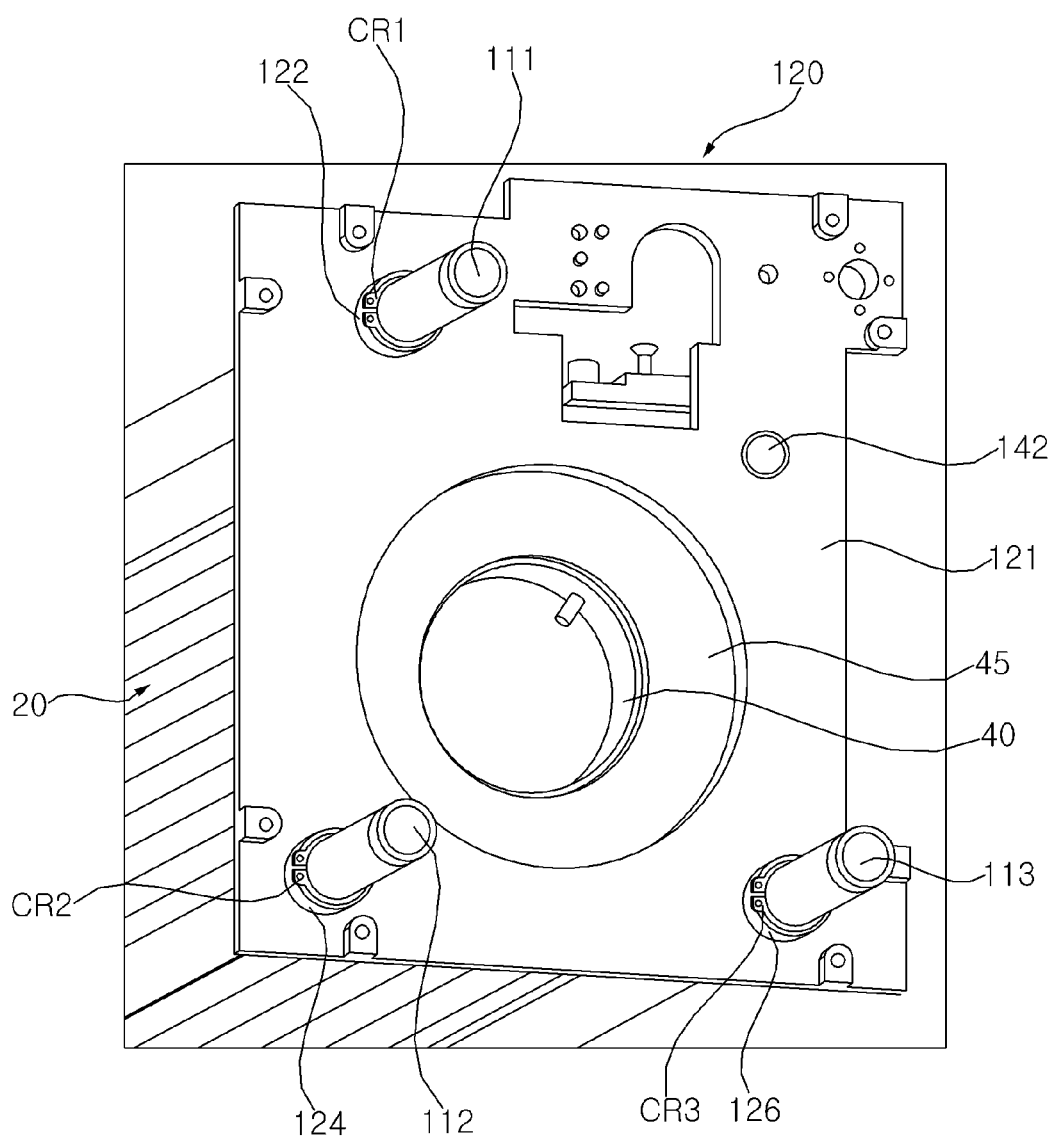

The fixed plate 143 may be fixed to the frame 130 by a fastening member (e.g., a screw) fastened to fastening holes 137h penetrating the frame 130. Referring to FIG. 21, the shaft 142 may be inserted into and fixed to the frame 120.

Figure 20:
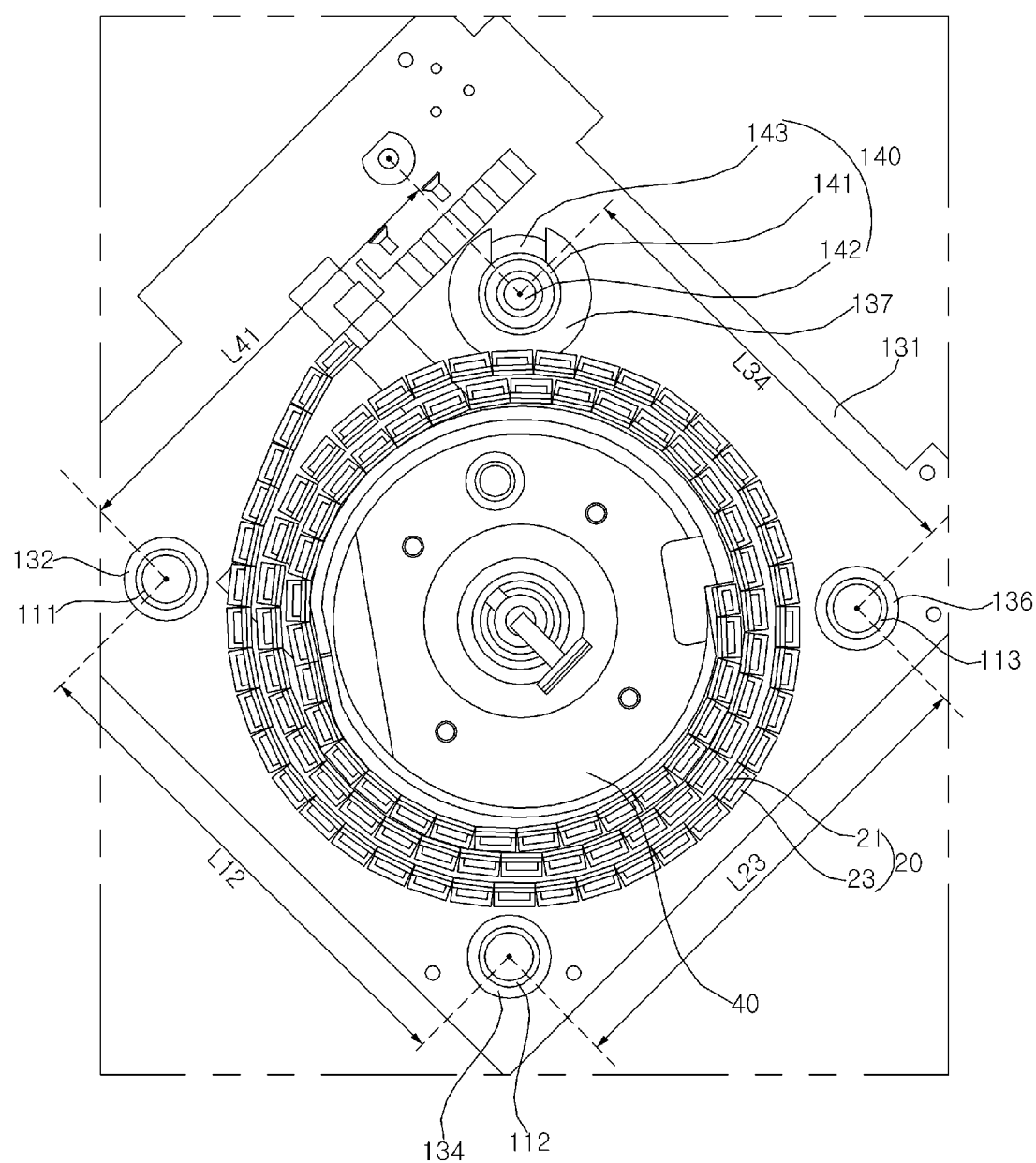

Referring to FIG. 20, the distance L12 between the first pipe 111 and the second pipe 112 may be larger than the distance L23 between the second pipe 112 and the third pipe 113. The distance L12 between the first pipe 111 and the second pipe 112 may be larger than the distance L34 between the third pipe 113 and the guide roller 130. The distance L12 between the first pipe 111 and the second piped 112 may be larger than the distance L41 between the first pipe 111 and the guide roller 140. The distance L23 between the second pipe 112 and the third pipe 113 may be larger than the distance L41 between the first pipe 111 and the guide roller 140. The distance L23 between the second pipe 112 and the third pipe 113 may be larger than the distance L34 between the third pipe 113 and the guide roller 140. The distance L34 between the third pipe 113 and the guide roller 140 may be larger than the distance L41 between the guide roller 140 and the first pipe 111. Consequently, the rigidity of the display device against torsion as well as sagging may be improved.

Referring to FIGS. 21 to 24, one end of the panel roller 40 may be positioned contiguous to the central opening 123 of the first frame 120. A rotating shaft of the panel roller 40 may be aligned in the center of the central opening 123 of the first frame 120. A bearing 45 may be mounted to the central opening 123 of the first frame 120. For example, the bearing 45 may be a ring bearing 45. One end of the panel roller 40 may be inserted or press-fitted into the bearing 45. The other end of the panel roller 40 may be rotatably coupled to the second frame 130. The panel roller 40 may have a rotating shaft 46, and the rotating shaft 46 may penetrate the first frame 130 and be installed on the second frame 130. The rotating shaft 46 may be connected to a lever 47, and manually rotate the panel roller 40 through the lever 47.

The coupling 136 may have the shape of a cylinder that is formed through the plate 131. The coupling 136 may be fixed to the plate 131, or may be formed integrally with the plate 131. The coupling 136 may have an outer side 1361 and an inner side 1362 with respect to the plate 131. The distance D2 of the outer side 1361 may be smaller than the distance D1 of the inner side 1362. For example, the distance D1 of the inner side 1362 may be five times as large as or larger than the distance d2 of the outer side 1361.

The pipes 112 and 113 may penetrate through inner sides 1342 and 1362 of the couplings 134 and 136 and be press-fitted to outer sides 1341 and 1361 thereof. The pipes 112 and 113 may not penetrate through the couplings 134 and 136 of the pipes 112 and 113. The outer sides 1341 and 1361 of the couplings 134 and 136 may cover distal ends of the pipes 112 and 113. A first fastening hole 136h1 and a second fastening hole 136h2 may be formed in the inner side 1362. As screws are fastened to the first fastening hole 136h1 and the second fastening hole 136h2, the pipe 113 may be firmly fixed to the frame 130.

Figure 25:
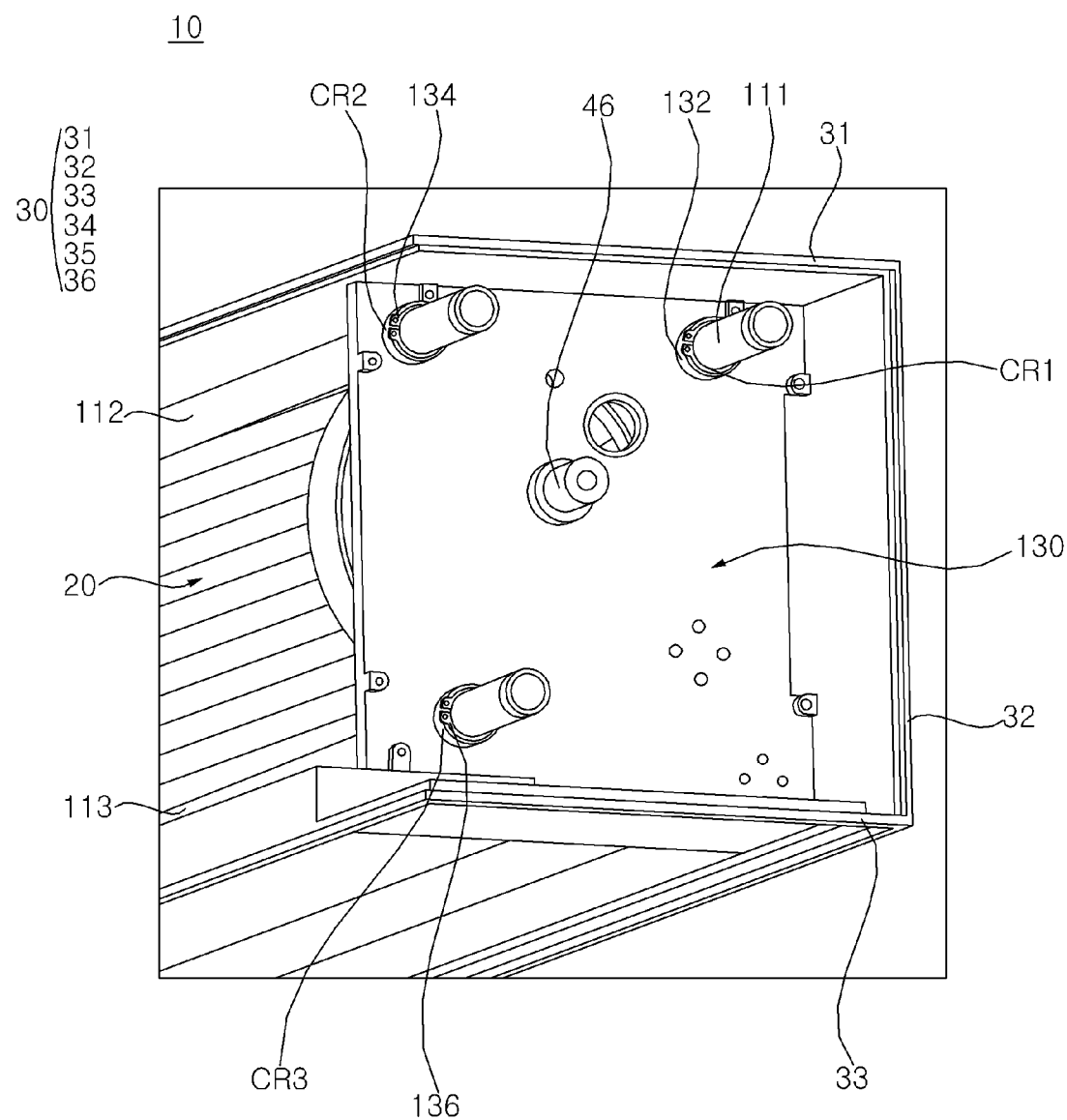

Referring to FIG. 25, the housing 30 may include an upper plate 31, a lower plate 33, a front plate 34 (see FIG. 1), and a rear plate 32. The upper plate 31 may be coupled to the first frame 120 and the second frame 130 while covering the first pipe 111 and the second pipe 112. The front plate 34 may be coupled to the first frame 120 and the second frame 130 while covering the second pipe 112 and the third pipe 113. The rear plate 32 may be coupled to the first frame 120 and the second frame 130 while covering the first pipe 111 and the guide roller 140. The lower plate 33 may be coupled to the first frame 120 and the second frame 130 while covering the third frame 113 and the guide roller 140. The lower plate 33 may be a door.

Figure 26:
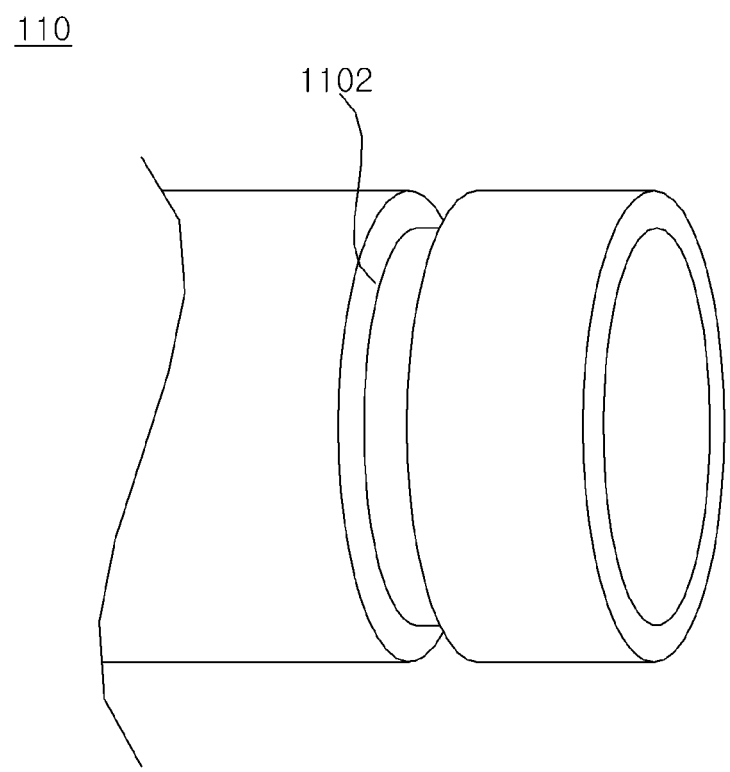
Figure 27:
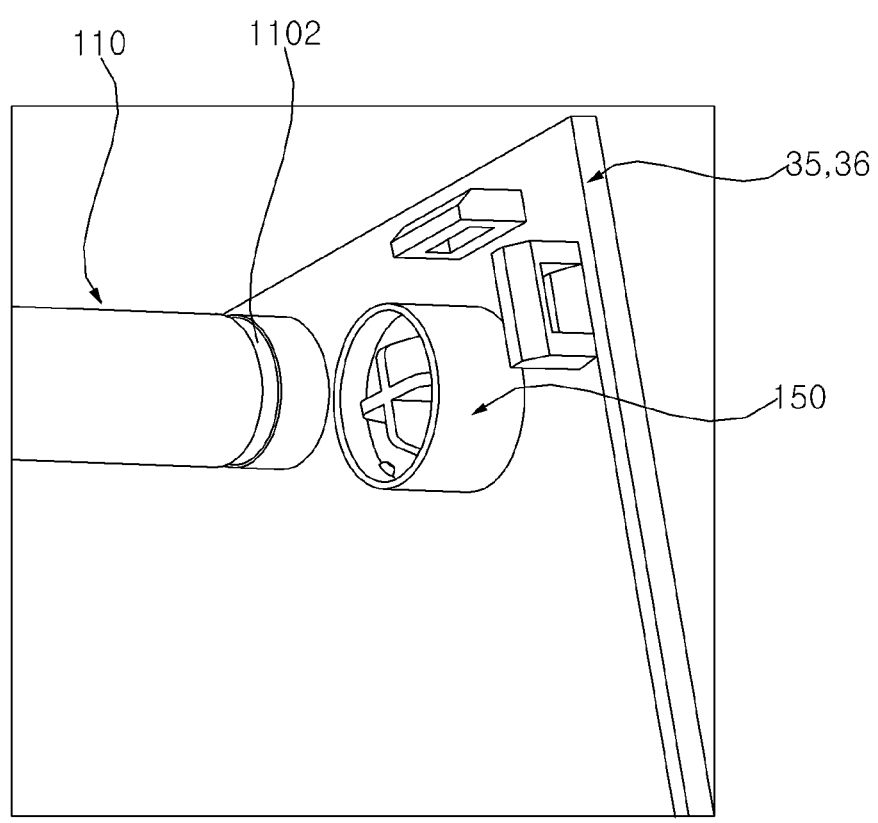

Referring to FIGS. 26 and 27, the pipe 110 may have a neck 1102 that is positioned contiguous to the distal end thereof and formed on the outer periphery of the pipe 110. The neck 1102 may be the second neck 1132 explained with reference to FIGS. 14 and 15. A description of the pipe 110 may be applicable to the first pipe 111, the second pipe 112, and the third pipe 113 described above.

The pipe 110 may be coupled to side covers 35 and 36. The coupling 150 may be formed on an inner side of the side covers 35 and 36. The pipe 110 may be inserted into or press-fitted to the coupling 150. The coupling 150 may be referred to as an end-coupler 150.

Figure 28:
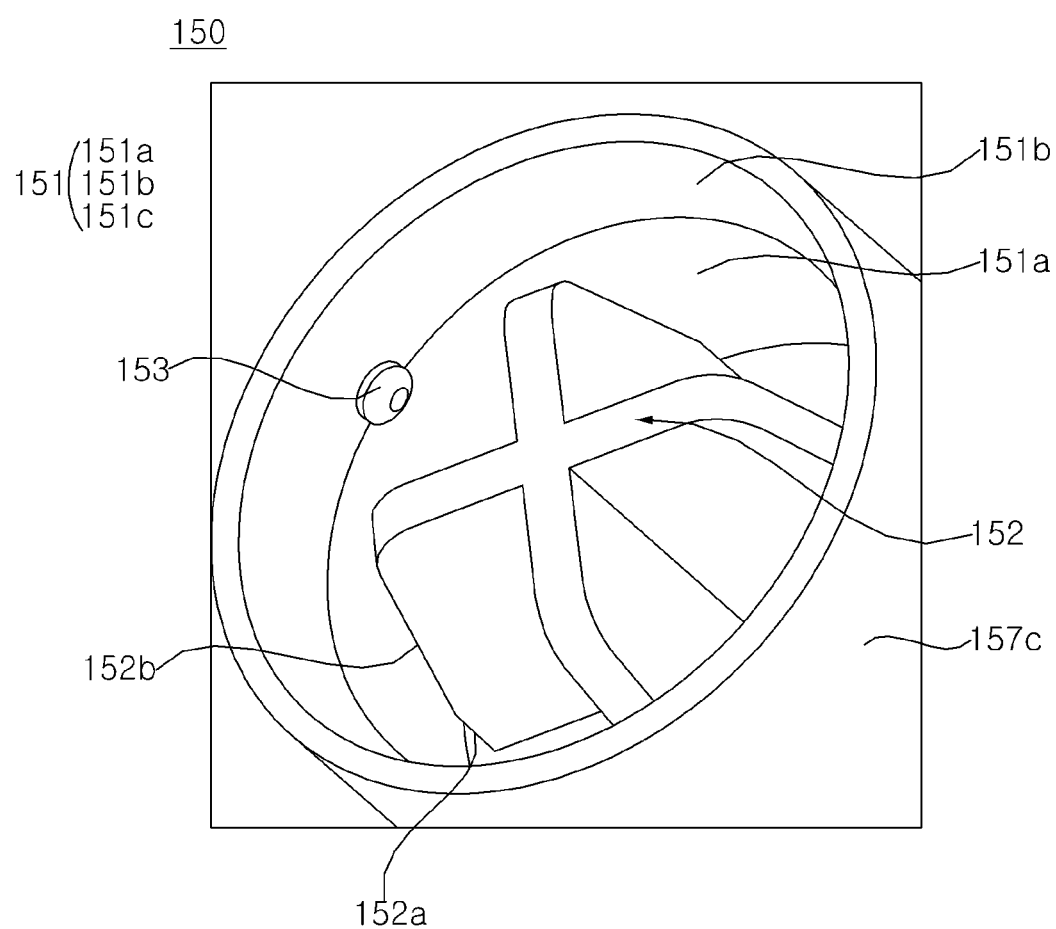
Figure 29:
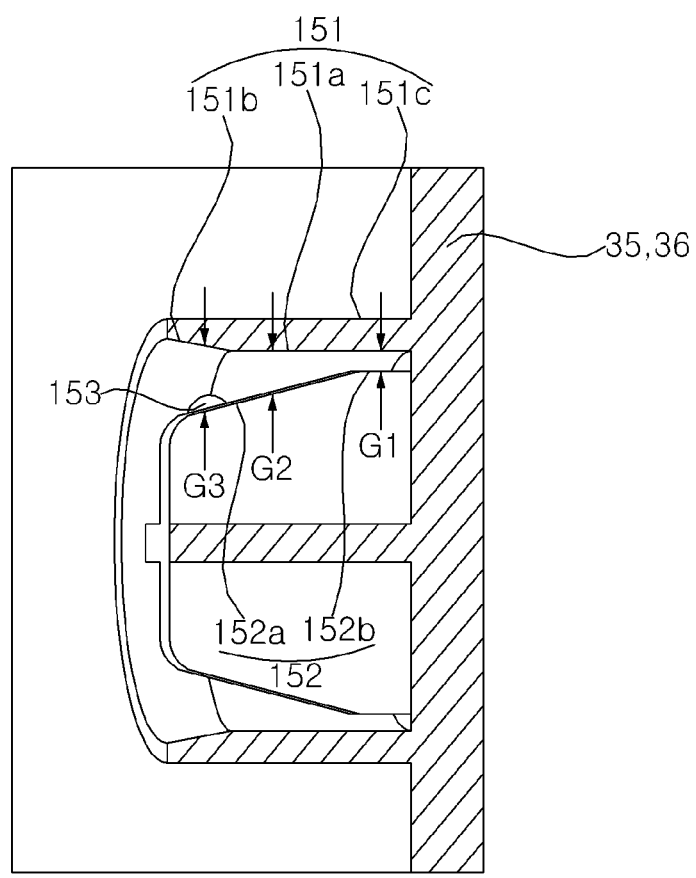

Referring to FIGS. 28 and 29, the coupling 150 may have an outer cylinder 151 and an inner insert 152. The outer cylinder 151 may have the shape of a hollow cylinder. The outer cylinder 151 may have an outer surface 151c, a first inner surface 151a, and a second inner surface 151b. The first inner surface 151a may be parallel to the outer surface 151c. The second inner surface 151b may extend with a slope from the first inner surface 151a to the distal end of the outer cylinder 151. The diameter of the second inner surface 151b may gradually increase from the diameter of the first inner surface 151a to the diameter of the outer surface 151c. The second inner surface 151b may be referred to as a guide surface 151b, and the first inner surface 151a may be referred to as a press-fitting surface 151a. A protrusion 153 may be formed inside the outer cylinder 151. For example, the protrusion 153 may be located at the border between the first inner surface 151a and the second inner surface 151b.

The inner insert 152 may be a rib extending from the side covers 35 and 36 (see FIG. 27) toward the distal end of the second inner surface 151b of the outer cylinder 151. The inner insert 152 may have a shape in which at least two ribs intersect. The inner insert 152 may have a first outer surface 152a and a second outer surface 152b. The first outer surface 152a may be spaced apart from the first inner surface 151a of the outer cylinder 151, and may be parallel to the first inner surface 151a of the outer cylinder 151. For example, the distance G1 between the first inner surface 151a of the outer cylinder 151 and the first outer surface 152a of the inner insert 152 may be substantially equal to or less than the thickness of the pipe 110. The second outer surface 152b of the inner insert 152 may extend with a slope from the first outer surface 152a to the distal end of the inner insert 152. The second outer surface 152b of the inner insert 152 may be gradually distant from the first inner surface 151a and/or the second inner surface 151b of the outer cylinder 151. For example, the inner insert 152 may have a wedge shape. The second outer surface 152b of the inner insert 152 may face the first inner surface 151a and second inner surface 151b of the outer cylinder 151.

The distance G1 between the first inner surface 151a of the outer cylinder 151 and the first outer surface 152a of the inner insert 152 may be less than the distance G2 between the first inner surface 151a of the outer cylinder 151 and the second outer surface 152b of the inner insert 152. The distance G2 between the first inner surface 151a of the outer cylinder 151 and the second outer surface 152b of the inner insert 152 may be less than the distance G3 between the second inner surface 151b of the outer cylinder 151 and the second outer surface 152b of the inner insert 152.

Figure 30:
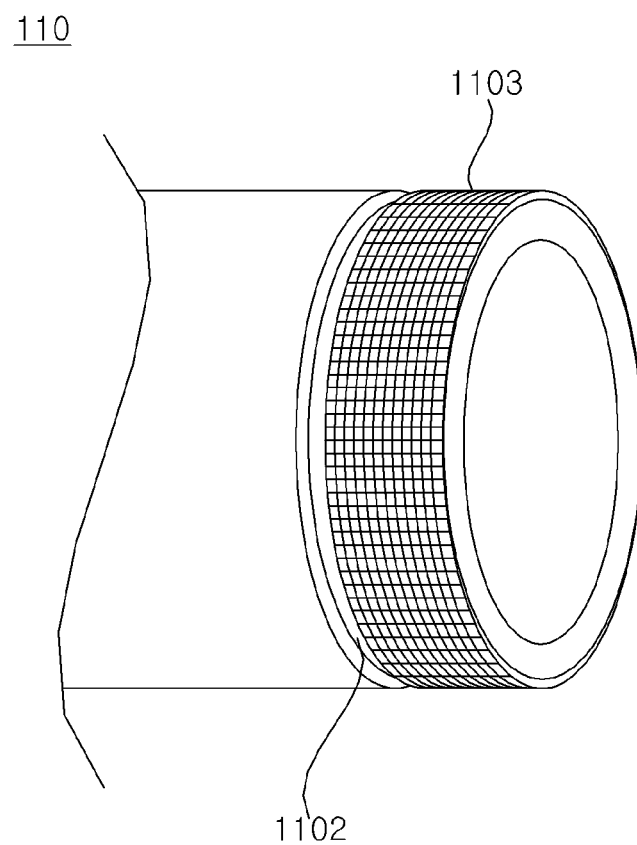

Referring to FIG. 30, the pipe 110 may have a press-fitting surface 1103. The press-fitting surface 1103 may be formed on an outer surface of the pipe 110 between the neck 1102 of the pipe 110 and the distal end of the pipe 110. The press-fitting surface 1103 may be a coarse surface. For example, the press-fitting surface 1103 may be a knurling portion.

Figure 31:
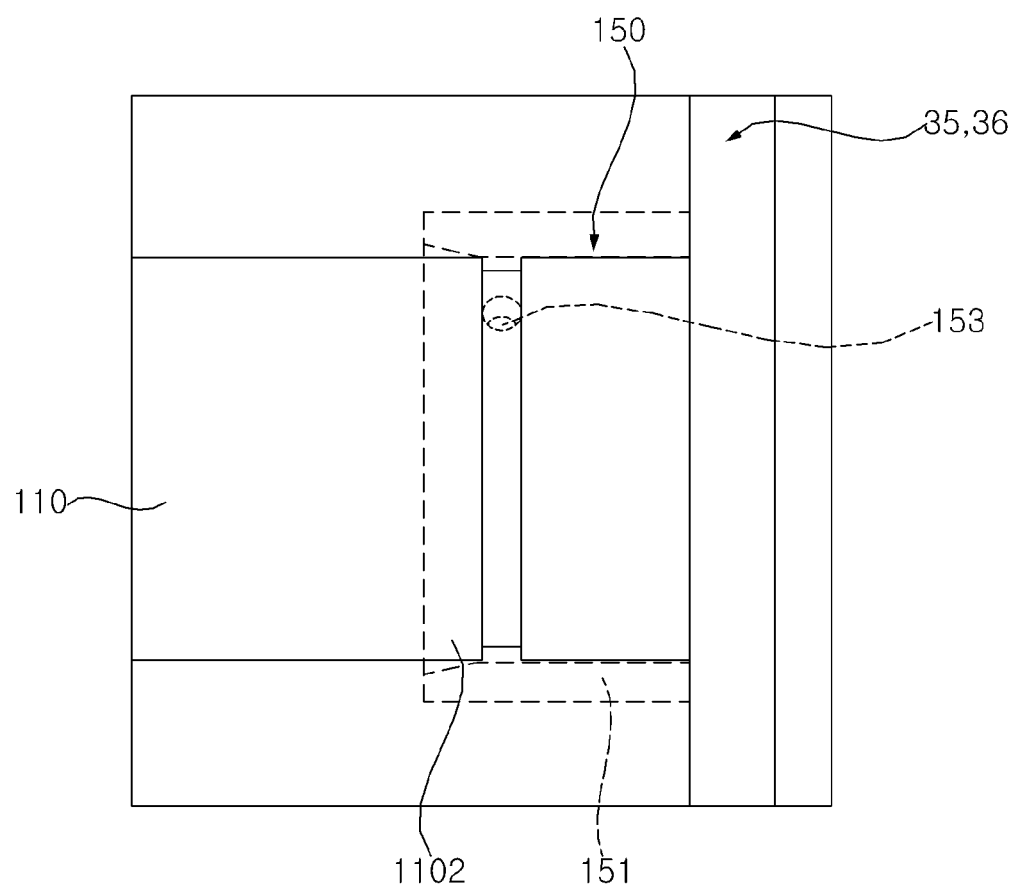
Figure 32:
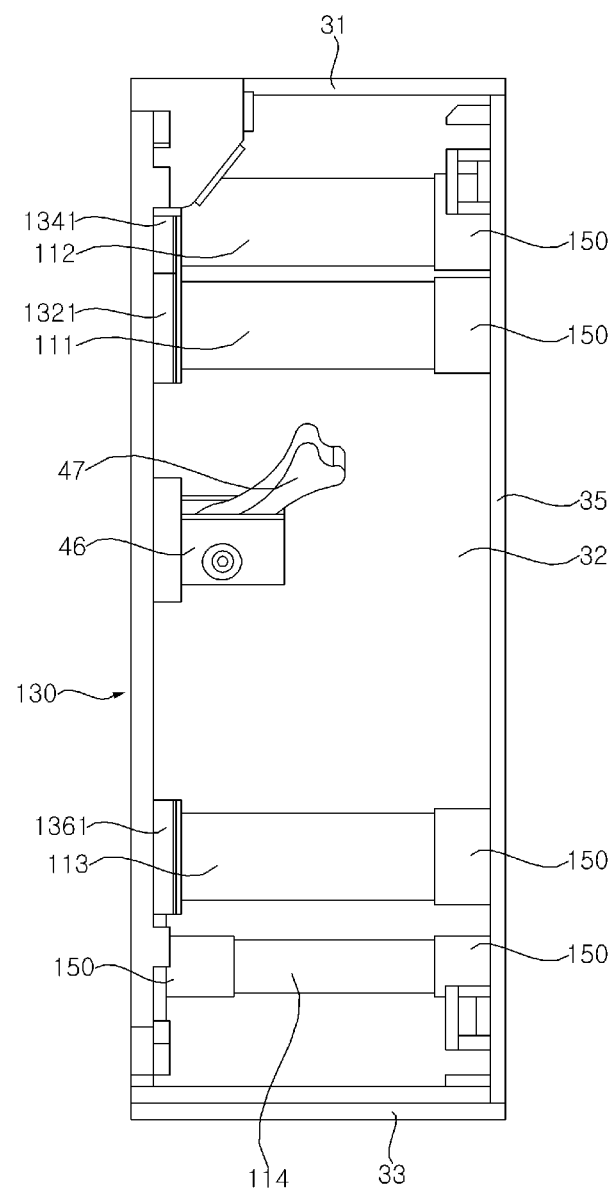
Figure 33:
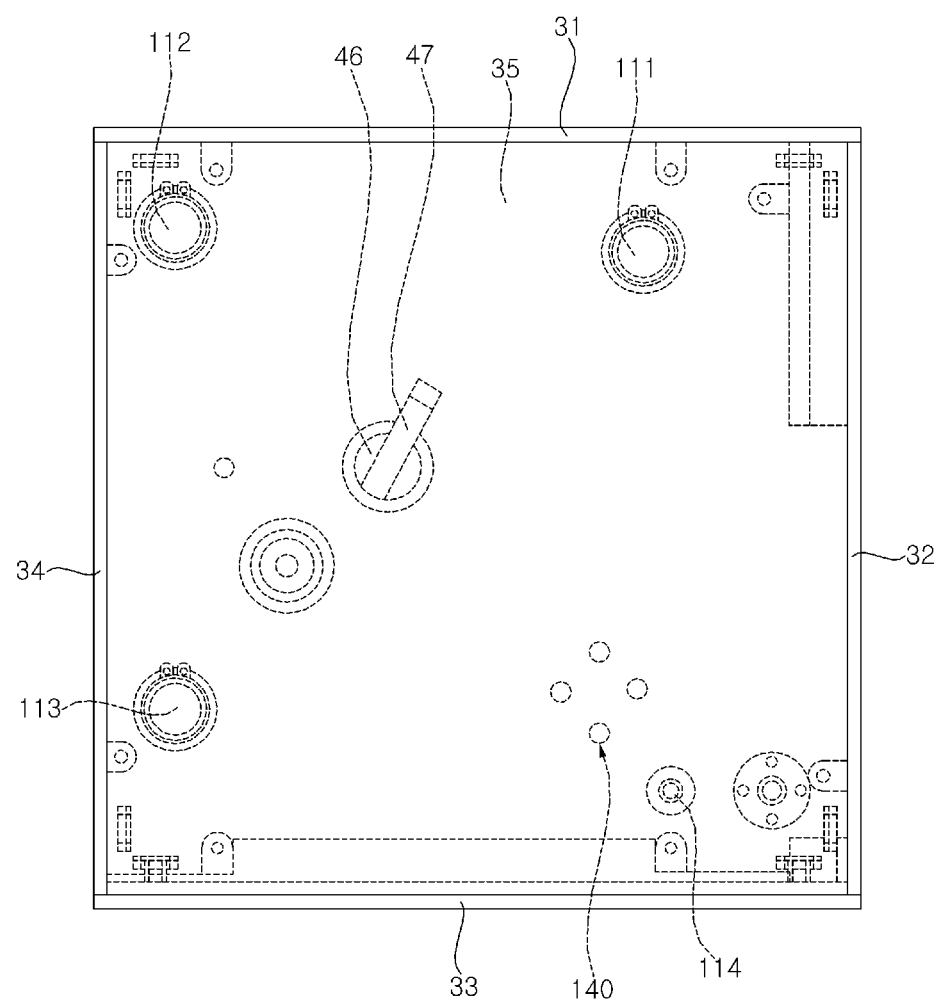

Referring to FIGS. 31 to 33, the pipe 110 may be inserted or press-fitted into the coupling port 150. The protrusion 153 may be inserted into the neck 1102 of the pipe 110. The first pipe 111, the second pipe 112, and the third pipe 113 may be inserted or press-fitted into their corresponding couplings 150. Consequently, the torsional rigidity of the display device may be provided.

Figure 23:
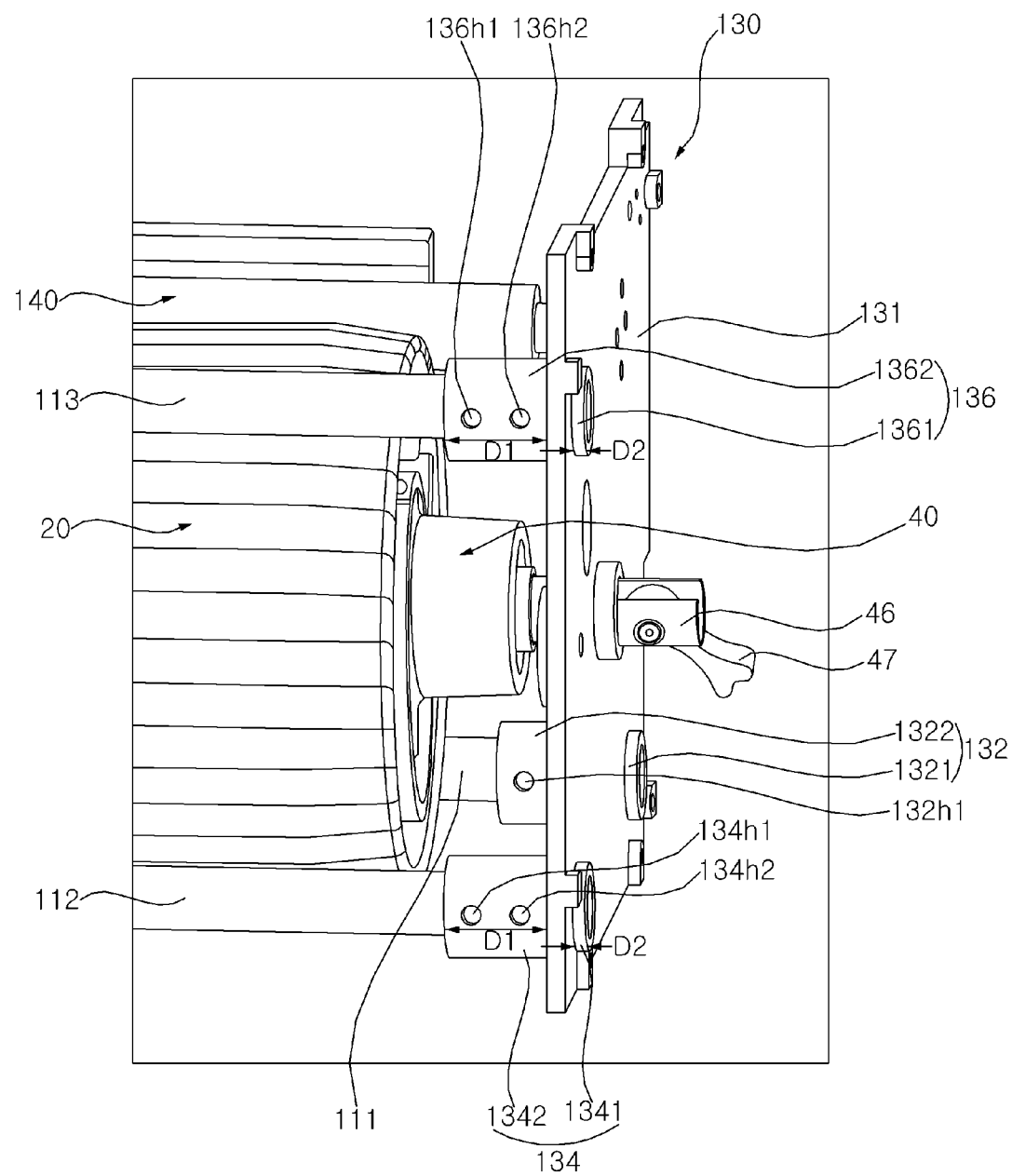
Figure 24:
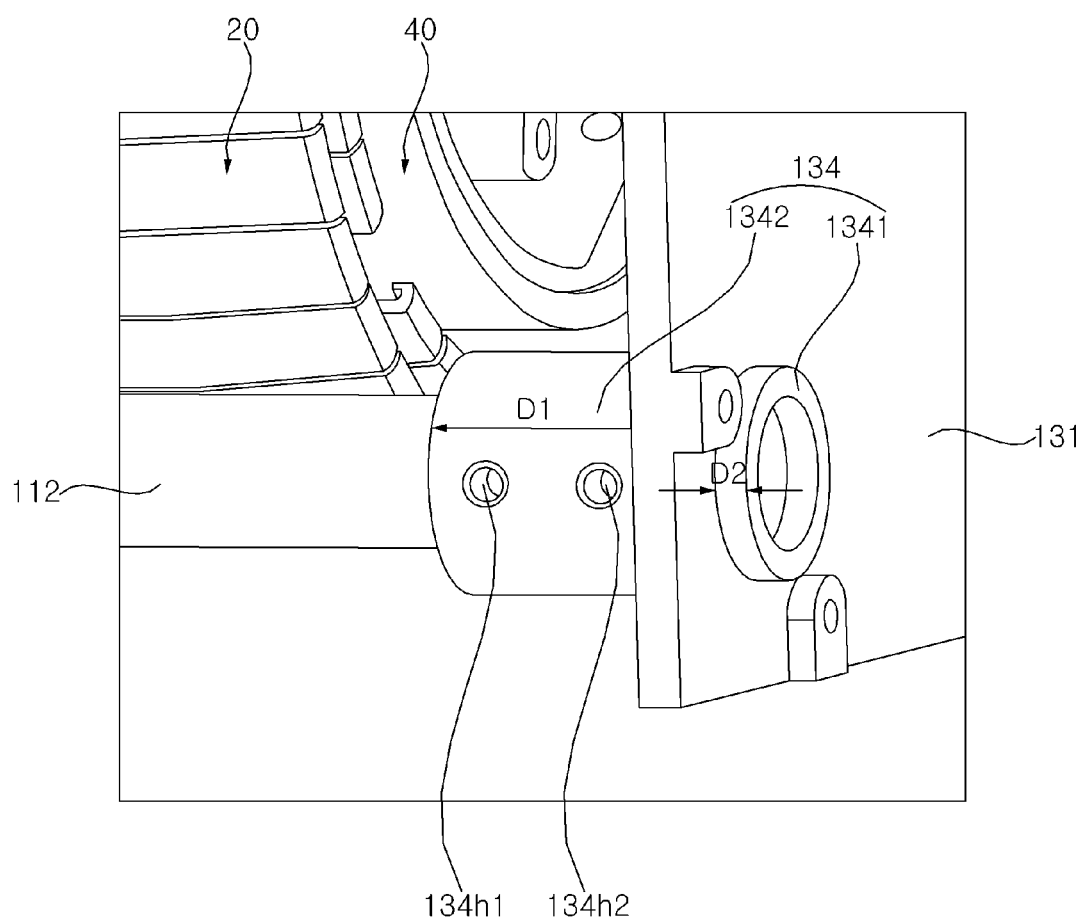

An auxiliary pipe 114 may face the second pipe 112 with respect to the shaft 46 of the roller 40 (see FIG. 23). The auxiliary pipe 114 may be inserted or press-fitted into the couplings 150 formed on the second frame 130 and the side cover 35. Consequently, the torsional rigidity of the display device may be more firmly secured, and the coupling stability of the side covers may be provided.

Figure 34:
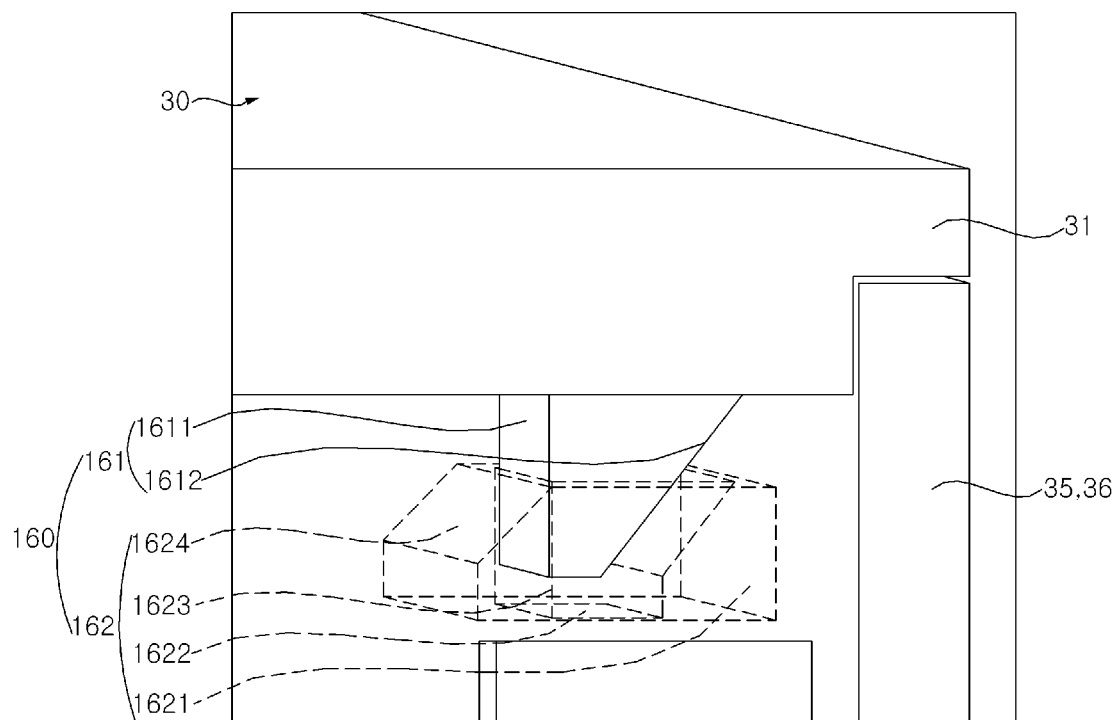

Referring to FIG. 34, a side coupler 160 may couple the housing 30 and the side covers 35 and 36 together. The side coupler 160 may include an engaging portion 161 and a holder 162. The engaging portion 161 may protrude inward of the upper plate 31 of the housing 30. The engaging portion 161 may have an engaging surface 1611 and a sloping surface 1612. The engaging surface 1611 may extend downward from an inner surface of the upper plate 31. The sloping surface 1612 may connect a lower end of the engaging surface 1611 and the inner surface of the upper plate 31. The sloping surface 1612 may face the side covers 35 and 36.

A holder 162 may be formed on an inner side of the side covers 35 and 36. The holder 162 may include a fixing portion 1621, an engaging groove 1622, and stoppers 1623 and 1624. The fixing portion 1621 may be fixed to the inner side of the side covers 35 and 36. The stoppers 1623 and 1624 may be placed apart from the fixing portion 1621. The engaging groove 1622 may connect the fixing portion 1621 and the stoppers 1623 and 1624. The engaging groove 1622 may provide a space into which the engaging portion 161 is inserted. The stoppers 1623 and 1624 may have a vertical surface 1623 that faces or is in contact with the engaging surface 1611 of the engaging portion 161 of the engaging portion 161 and a guide surface 1624 where the sloping surface 1612 of the engaging portion 161 slides. A bottom surface of the engaging groove 1622 may be spaced apart from the engaging portion 161.

The side coupler 160 may be provided on the upper plate 31, lower plate 33, front plate 34, and rear plate 32 of the housing 30. Consequently, the upper plate 31, the lower plate 33, the front plate 34, and/or the rear plate and the side cover 35 and 36 may be firmly coupled together.

Figure 35:
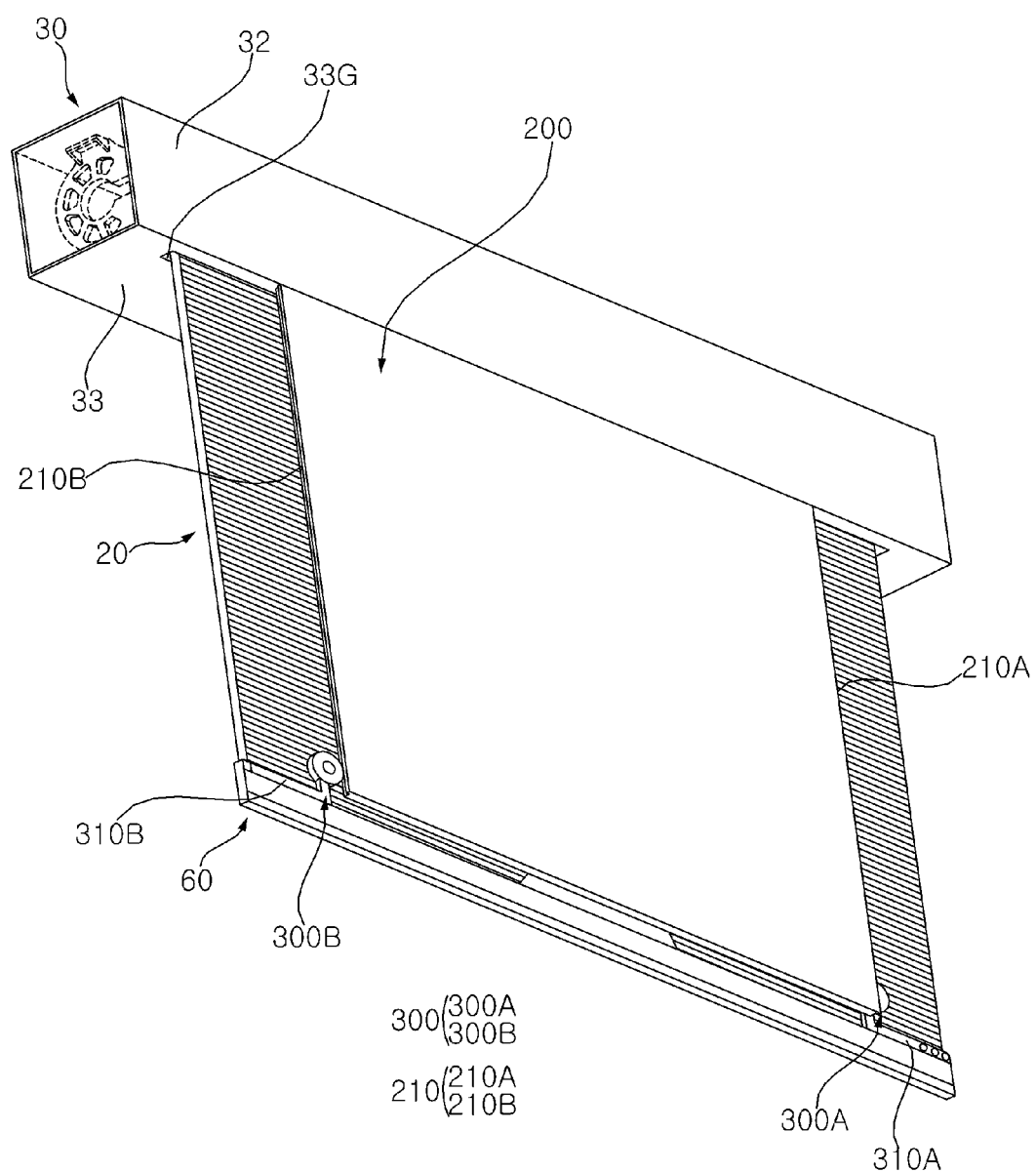
Figure 36:
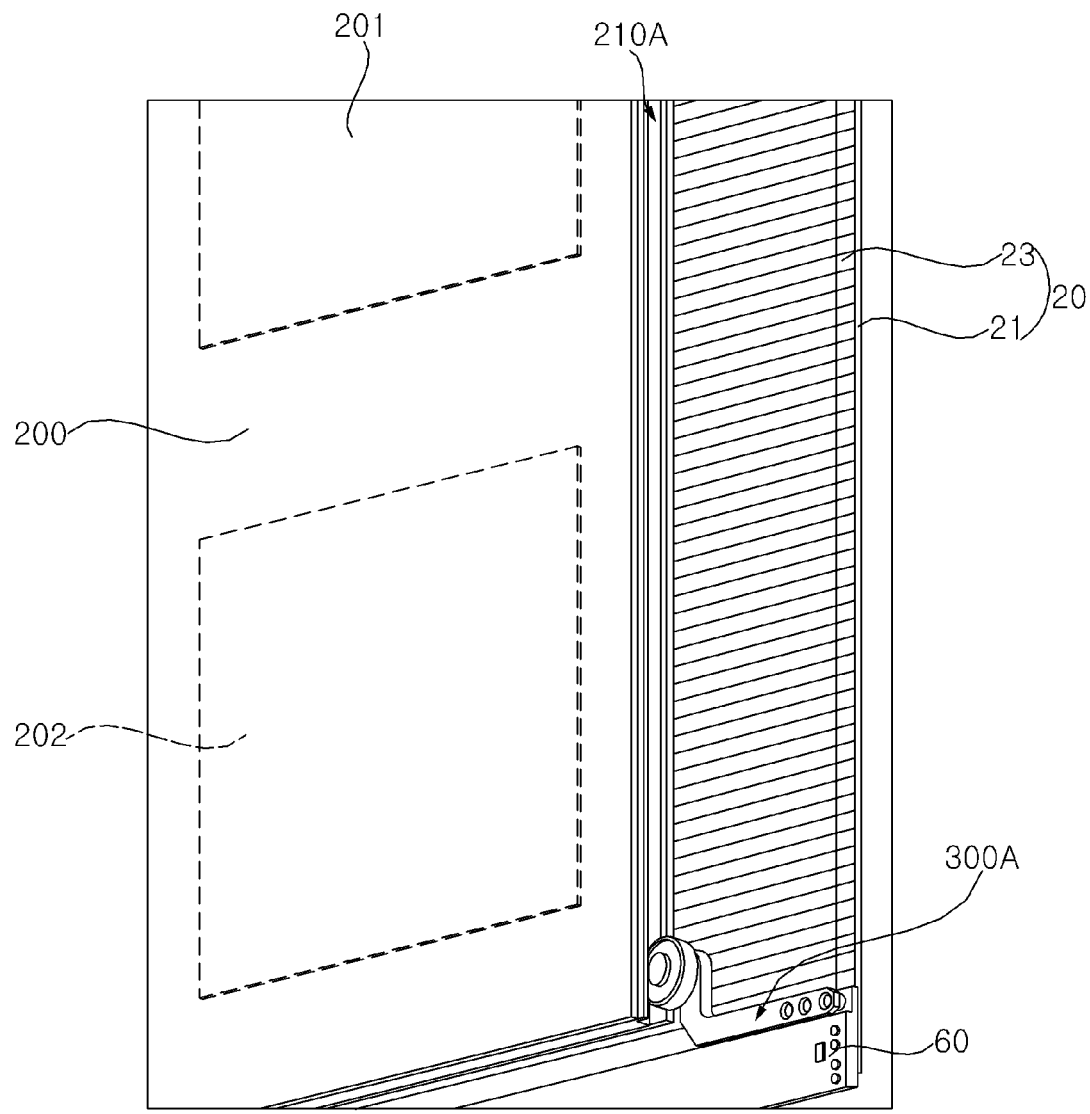

Referring to FIGS. 35 and 36, the lower plate 33 of the housing 30 may include an opening 33G that extends longitudinally in the lengthwise direction of the housing 30. The length of the opening 33G may correspond to the breadth of the display unit 20. For example, the length of the opening 33G may be slightly larger than the breadth of the display unit 20. The display unit 20 may move into or out of the housing 30 through the opening 33G.

A board case 200 may be positioned under the housing 30. The board case 200 may have the shape of a plate. The board case 200 may be smaller in size than the size of the display panel 21 or the module cover 23. The board case 200 may be positioned behind the display panel 21 or the module cover 23. An upper end of the board case 200 may be contiguous to the lower plate 33 of the housing 30. Rails 210A and 210B may be mounted on one side or both sides of the board case 200. The rails 210A and 210B may be formed longitudinally in the upward-downward direction of the board case 200. The display unit 20 may move down while restrained by the rails 210 and 210B of the bord case 200. That is, the movement of the display unit 20 may move freely upward and downward but be restrained in the front-back direction by the rails 210A and 210B.

The board case 200 may accommodate control boards 201 and 202. For example, the board case 200 may accommodate a power supply unit 201, a main board 202, etc. The power supply unit 201 and/or the main board 202 may have the shape of a rectangular plate, and the thickness of the power supply unit 201 and/or the main board 202 may be smaller than the thickness of the board case 200. The main board 202 may be electrically connected to the timing controller board 41 (see FIG. 10). The power supply unit 201 may supply power to the main board 202, the timing controller board 41, and/or the display panel 21.

Figure 37:
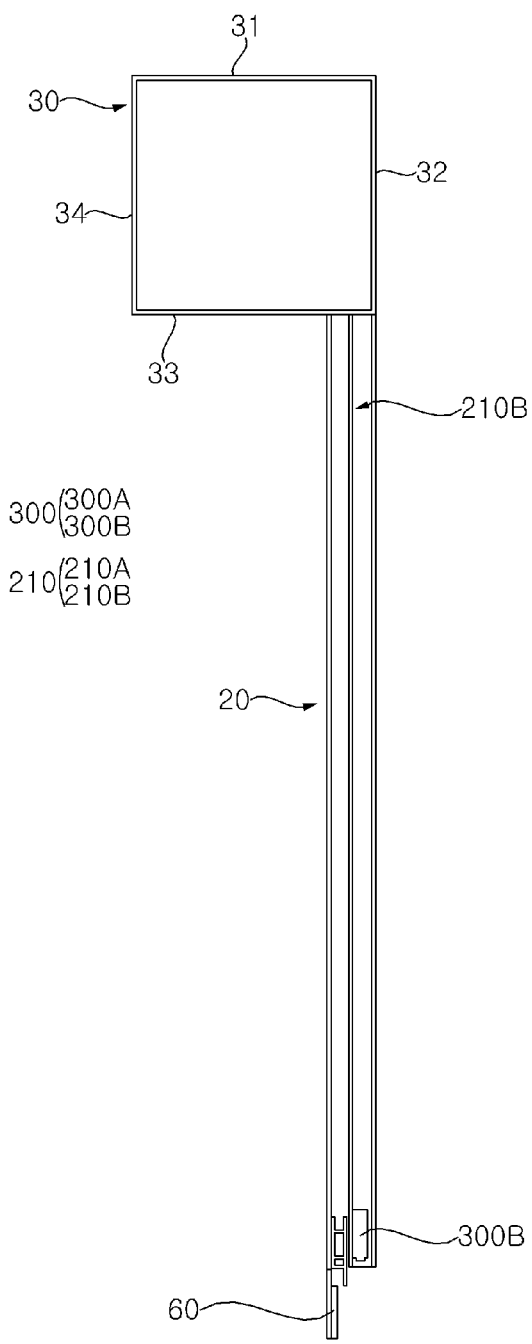
Figure 38:
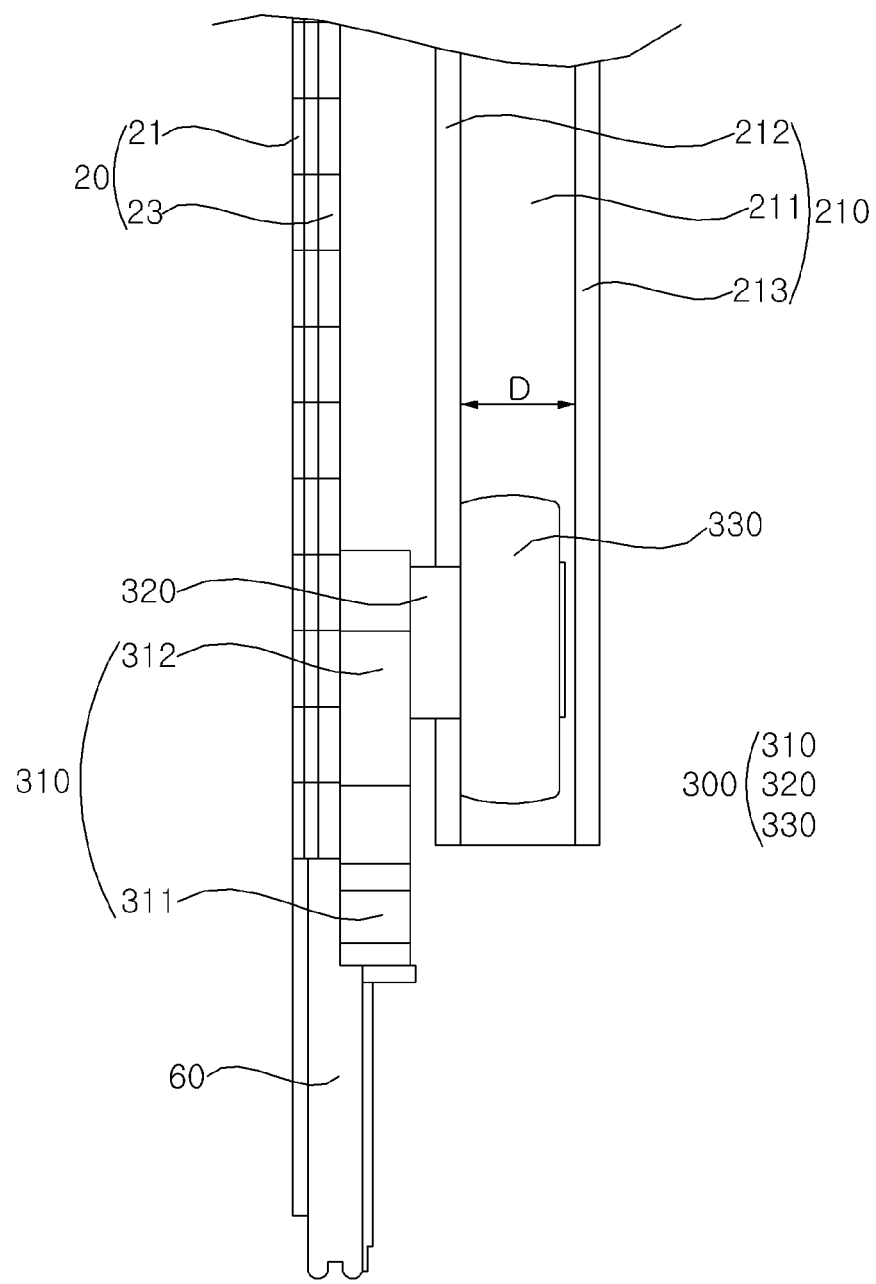

Referring to FIGS. 37 and 38, the roller 300 may move on the rails 210. The roller 300, along with a bottom case 60, may move down from the housing 30 or move up toward the housing 30. The rails 210 may include a rolling portion 211, a guide portion 213, and a restraining portion 212. The guide portion 213 may be referred to as a first side wall 213, and the restraining portion 212 may be referred to as a second side wall 212. The rolling portion 211 may form a side of the board case 200. The roller 300 may move on the rolling portion 211. The rolling portion 211 may generate rolling friction resistance against the roller 300. To prevent noise and/or vibration, the roller 30 may include urethan, for example. The roller 300 may be referred to as a holding roller 300.

The restraining portion 212 may assist the roller 300 to be vertically lowered from and/or vertically raised toward the housing 30 while moving on the rolling portion 211. The roller 300 may move on the rolling portion 211 as a side of the roller 300 is in contact with the restraining portion 212. The guide portion 213 may face the restraining portion 212 with respect to the rolling portion 211. The guide portion 213 may be opposite the restraining portion 212. The guide portion 213 may prevent the roller 300 from falling off the rolling portion 211 while moving on the rolling portion 211. The distance D between the guide portion 213 and the restraining portion 212 may be larger than the thickness of the roller 300.

Figure 39:
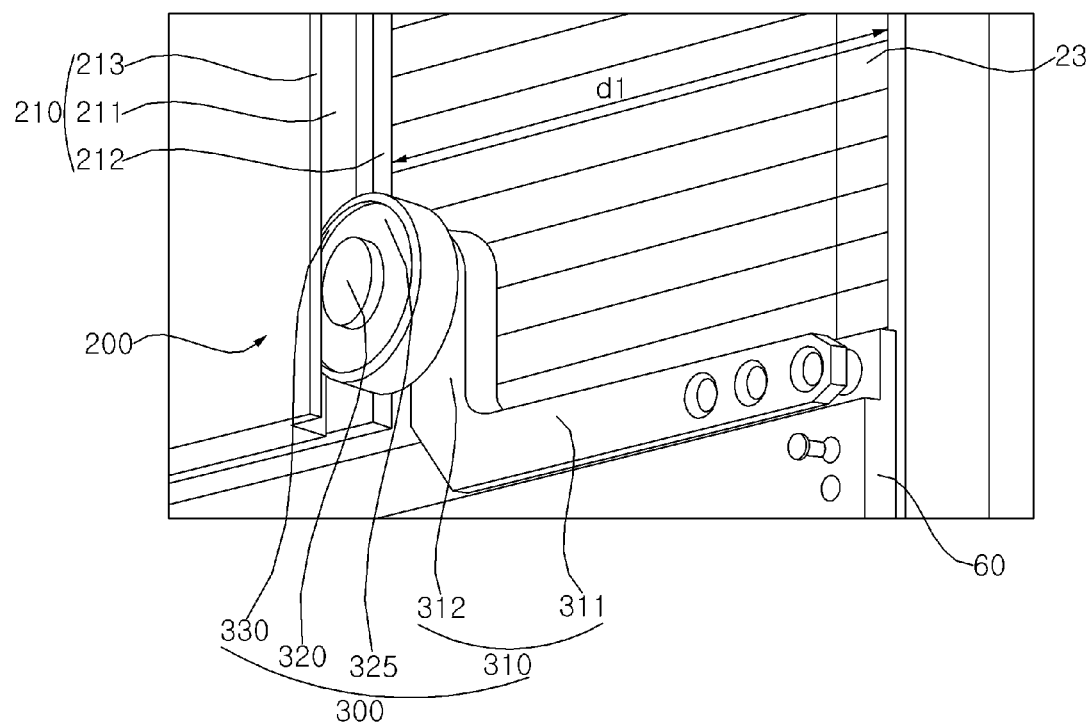

Referring to FIG. 39, a roller bracket 310 may be connected or coupled to the bottom case 60. The roller 300 may be rotatably mounted to the roller bracket 310. The roller bracket 310 may have a first part 311 and a second part 312. The first part 311 may extend longitudinally in the lengthwise direction of the bottom base 60. The length of the first part 311 may be smaller than the distance d1 between a side edge of the module cover 23 and a side of the board case 200. The first part 311 may be positioned parallel to the lengthwise direction of the bottom case 60, and one end of the first part 311 may be fixed to the bottom case 60, contiguous to a side edge of the bottom case 60.

The second part 312 may extend while bending at the first part 311. The second part 312 may be bent upward from the bottom case 60 toward the housing 30 (see FIG. 35). The length of the second part 312 may be smaller than the length of the first part 311. The roller 300 may be rotatably coupled to the second part 312.

The roller 300 may include a rotating shaft 320, a rim 325, and a tire 330. The rotating shaft 320 may be fixed to the second part 312. The rim 325 may be rotatably coupled to the rotating shaft 320. A bearing (not shown) may be coupled between the rim 325 and the rotating shaft 320. The tire 330 may surround the perimeter of the rim 325. For example, the tire 330 may be urethane.

Figure 40:
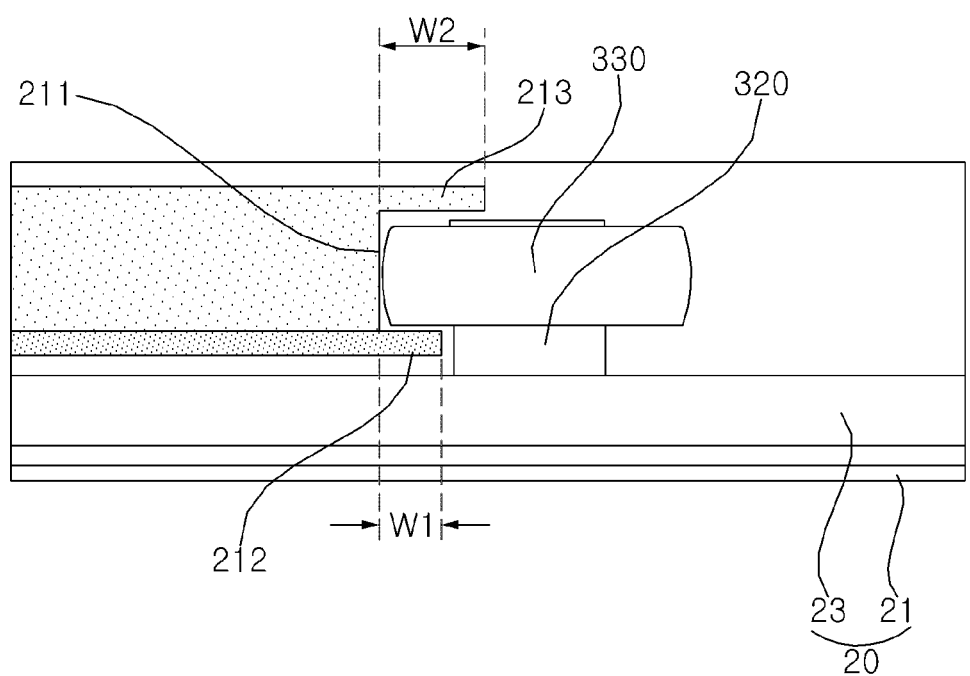

Referring to FIGS. 39 and 40, the distance W1 from the rolling portion 211 to an upper end of the restraining portion 212 may be smaller than the distance W2 from the rolling portion 211 to an upper end of the guide portion 213. The height W1 of the restraining portion 212 may be larger than the thickness of the tire 330. The restraining portion 212 may cover the side of the rim 325 as well as the side of the tire 330. The height W2 of the guide portion 213 may be larger than the thicknesses of the tire 330 and the rim 325. The guide portion 213 may cover part of the rotating shaft 320, as well as the sides of the tire 330 and the rim 325.

Referring to FIGS. 35 and 37, the roller 300 may include a first roller 300A and a second roller 300B. The roller bracket 310 may have a first roller bracket 310A and a second roller bracket 310B. The first roller bracket 310A may be coupled to a right end of the bottom case 60, and the second roller bracket 310B may be coupled to a left end of the bottom case 60. The first roller 300A may be coupled to the first roller bracket 310A and move on the first rail 210A formed on the right side of the board case 200, and the second roller 300B may be coupled to the second roller bracket 310B and move on the second rail 210B formed on the left side of the board case 200. Consequently, the display unit 200 may be vertically lowered from and raised toward the housing 30.

According to an aspect of the present disclosure, there is provided a display device comprising: a flexible display panel; a panel roller which is elongated and on or from which the display panel is wound or unwound; a housing in which the panel roller is accommodated, wherein while the display panel is unwound from the panel roller, the display panel descends below the housing; and a board case which is disposed behind the display panel descending below the housing, and of which the front surface is covered by the display panel while the display panel descends.

According to another aspect of the present disclosure, the display device further comprises: a rail formed in an upward-downward direction of the board case; a bottom case placed contiguous to a lower side of the display panel and coupled to the display panel; and a holding roller fixed to the bottom case and moving on the rail.

According to another aspect of the present disclosure, the holding roller includes: a roller bracket having a first part coupled to a rear surface of the bottom case and a second part extending from the first part and positioned contiguous to the rail; a rotating shaft formed on the second part; a rim rotatably coupled to the rotating shaft; and a tire formed around the perimeter of the rim and making contact with the rail.

According to another aspect of the present disclosure, the rail includes: a rolling portion that rolls in contact with the tire; a restraining portion that makes contact with a side of the tire facing the display panel; and a guide portion facing the restraining portion with respect to the rolling portion.

According to another aspect of the present disclosure, the distance between the restraining portion and the guide portion is larger than the width of the tire.

According to another aspect of the present disclosure, the height from the rolling portion to an upper end of the restraining portion is smaller than the height from the rolling portion to an upper end of the guide portion.

According to another aspect of the present disclosure, the display device of claim further comprises: a first pipe extending longitudinally in the lengthwise direction of the panel roller, and positioned contiguous to the panel roller inside the housing; a second pipe extending longitudinally in the lengthwise direction of the panel roller, positioned contiguous to the panel roller inside the housing, and facing the first pipe with respect to the panel roller; a third pipe extending longitudinally in the lengthwise direction of the panel roller, and positioned contiguous to the panel roller between the first pipe and the second pipe inside the housing; and a guide roller extending longitudinally in the lengthwise direction of the panel roller, and facing the third pipe with respect to the panel roller inside the housing, wherein the display panel is wound around or unwound form the panel roller while passing between the first pipe and the guide roller.

According to another aspect of the present disclosure, the board case is positioned contiguous to the guide roller.

According to another aspect of the present disclosure, the display device comprises: a main board that supplies an electrical signal to the display panel; and a power supply unit that supplies power to the main board or the display panel, wherein the main board and the power supply unit are accommodated in the board case.

According to another aspect of the present disclosure, the display device further comprises a timing controller board positioned inside the panel roller, wherein the main board supplies an electrical signal to the timing controller board.

Consequently, it is possible to improve bending of the display panel 21 which may occur when the display unit 20 is wound around or unwound from the panel roller 40 and the display unit 21 moves down from the housing 30.

Certain embodiments or other embodiments of the disclosure described above are not mutually exclusive or distinct from each other. Configurations or functions of embodiments of the disclosure described above may be used together or combined with each other.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The above detailed description should not be construed as restrictive in all respects and should be considered as illustrative. The scope of the present invention should be determined by reasonable interpretation of the appended claims, and all modifications within the equivalent scope of the present invention are included in the scope of the present invention.

What is claimed is:

1. A display device comprising:
    a flexible display panel;
    a panel roller which is elongated and on or from which the display panel is configured to be wound or unwound;
    a housing in which the panel roller is accommodated, wherein while the display panel is unwound from the panel roller, the display panel descends below the housing;
    a board case which is disposed behind the display panel descending below the housing, and having a front surface which is covered by the display panel while the display panel descends;
    a rail formed in an upward-downward direction of the board case;
    a bottom case placed contiguous to a lower side of the display panel and coupled to the display panel; and
    a holding roller fixed to the bottom case and moving on the rail, wherein the holding roller includes:
    a roller bracket having a first part coupled to a rear surface of the bottom case and a second part extending from the first part and positioned contiguous to the rail;
    a rotating shaft formed on the second part;
    a rim rotatably coupled to the rotating shaft; and
    a tire formed around the perimeter of the rim and configured to make contact with the rail.

2. The display device of claim 1, wherein the rail includes:
    a rolling portion that rolls in contact with the tire;
    a restraining portion that makes contact with a side of the tire facing the display panel; and
    a guide portion facing the restraining portion with respect to the rolling portion.

3. The display device of claim 2, wherein the distance between the restraining portion and the guide portion is larger than the width of the tire.

4. The display device of claim 3, wherein the height from the rolling portion to an upper end of the restraining portion is smaller than the height from the rolling portion to an upper end of the guide portion.

5. The display device of claim 1, further comprising:
    a first pipe extending longitudinally in a lengthwise direction of the panel roller, and positioned contiguous to the panel roller inside the housing;
    a second pipe extending longitudinally in the lengthwise direction of the panel roller, positioned contiguous to the panel roller inside the housing, and facing the first pipe with respect to the panel roller;
    a third pipe extending longitudinally in the lengthwise direction of the panel roller, and positioned contiguous to the panel roller between the first pipe and the second pipe inside the housing; and
    a guide roller extending longitudinally in the lengthwise direction of the panel roller, and facing the third pipe with respect to the panel roller inside the housing, wherein the display panel is wound around or unwound form the panel roller while passing between the first pipe and the guide roller.

6. The display device of claim 5, wherein the board case is positioned contiguous to the guide roller.

7. The display device of claim 1, comprising:
    a main board that supplies an electrical signal to the display panel; and
    a power supply unit that supplies power to the main board or the display panel, wherein the main board and the power supply unit are accommodated in the board case.

8. The display device of claim 7, further comprising a timing controller board positioned inside the panel roller,
    wherein the main board supplies an electrical signal to the timing controller board.

* * * * *